United States Patent

Galand et al.

[11] Patent Number: 5,956,341
[45] Date of Patent: Sep. 21, 1999

[54] METHOD AND SYSTEM FOR OPTIMIZING DATA TRANSMISSION LINE BANDWIDTH OCCUPATION IN A MULTIPRIORITY DATA TRAFFIC ENVIRONMENT

[75] Inventors: Claude Galand, Cagnes-sur-mer; Gerald Lebizay, Vence; Victor Spagnol, Cagnes-sur-mer, all of France

[73] Assignee: International Business Machines Corporation, Armonk, N.Y.

[21] Appl. No.: 08/907,399

[22] Filed: Aug. 7, 1997

[30] Foreign Application Priority Data

Dec. 13, 1996 [EP] European Pat. Off. ............... 96480111

[51] Int. Cl.[6] ............... H04L 12/28; H04L 12/56
[52] U.S. Cl. .......... 370/412; 370/413; 370/415; 370/417
[58] Field of Search .................. 370/412, 468, 370/470, 471, 473, 474, 394, 395, 413, 414, 352

[56] References Cited

U.S. PATENT DOCUMENTS 5,570,355  10/1996  Dail et al. ............... 370/352
5,608,733  3/1997   Vallee et al. ............ 370/394

*Primary Examiner*—Jeffery A. Hofsass
*Assistant Examiner*—John Pezzlo
*Attorney, Agent, or Firm*—John D. Flynn; Morgan & Finnegan

[57] ABSTRACT

A method and system for optimizing data link occupation in a multipriority data traffic environment by using data multiplexing techniques over fixed or variable length data packets being asynchronously transmitted. The packets are split into segments including both a segment number and a packet number. The segments are dispatched, on a priority basis, over available links or virtual channels based on a global link availability control word indications, which control word is dynamically adjusted according to specific predefined conditions.

13 Claims, 19 Drawing Sheets

|  | 1 BYTE | 1 BYTE | 4 BYTES |
|---|---|---|---|
| RT1 PXCB 0 | PKT NO XPKTN | SEGT NO XSEGN | PACKET LIST PTR XPKT |
| RT2 PXCB 1 | XPKTN | XSEGN | XPKT |
| NRT PXCB 2 | XPKTN | XSEGN | XPKT |
| NR PXCB 3 | XPKTN | XSEGN | XPKT |

FIG. 5

METHOD AND SYSTEM FOR OPTIMIZING DATA TRANSMISSION LINE BANDWIDTH OCCUPATION IN A MULTIPRIORITY DATA TRAFFIC ENVIRONMENT

BACKGROUND OF THE INVENTION

1. Field of the Invention

This invention deals relates to data communication networks. More particularly, the invention relates to a method and system for optimizing data line/link occupation in a multipriority data traffic environment by using data multiplexing techniques of asynchronously transmitted fixed or variable length data packets.

2. Background Information

Modern digital networks are made to (1) operate in a multimedia environment for transporting different kinds of digitally encoded data including voice, images, video signals etc. . . , and (2) enable worldwide coverage while ensuring compliance with a number of requirements specific to each kind of traffics. For instance, while so-called non-real time information can be delivered to the corresponding end-user with minor time constraint restrictions, real-time type of information must be delivered to end-user with predefined limited time delay restrictions.

World-wide coverage is achieved by interconnecting different types of networks including network nodes (i.e., access nodes and transit nodes) connected to each other through high speed lines herein also referred to as links. Such a composite network is represented in FIG. 1. The users get access to the network through ports located in the access nodes. The users' data are processed by an access agent running in the port. The functions of the access agent are two-fold: First interpret the user's protocol, and second set the path and route the data through the network.

Different techniques have been developed for organizing the digitally encoded data transport. These include packet switching techniques whereby the digitized data are arranged into so-called packets. The packets may either be of fixed length, like in the so-called Asynchronous Transfer Mode (ATM), or be of variable length (VL) nature.

A modern international network may be rather complex, include leased lines and look like the network of FIG. 2.

In addition to leased lines, this network would support Frame Relay and ATM networks. The network offers the possibility of carrying native Asynchronous Transfer Mode (ATM) traffic as well as Variable Length (VL) traffic, which VL traffic may include both user's traffic and control traffic. A fundamental difference between both VL traffics is that while user's traffic needs be vehiculated along a given path from a source end user to a destination end user without affecting the network, control traffic should be addressed to (a) specific node (s), be decoded therein and control the very network architecture and operation. It should also be noted that whatever be the type of traffic, data are provided to the network at random.

The above description of networks helps visioning complex modern network transmission facilities. The description also helps understanding that the system should be optimized from a cost efficiency standpoint. Accordingly, the present invention shall focus on link operation efficiency, and more particularly optimizing link bandwidth occupation.

Let's first recall that links available in the US include so-called T1 operating at 1.544 Mbps and T3 at 44.736 Mbps, while in Europe one may find the E1 at 2.048 Mbps and E3 at 34.368 Mbps.

Now, let's assume a network service provider requires either an access link to a network or a link between two nodes at medium rate, say between 2 and 10 Mbps. The obvious solution should lead to selecting a T3/E3 link. However, such selection would not fit from a cost/efficiency standpoint, bearing in mind the presently practiced tariffs. For example, these tariffs in 1995 are in France (in K$/month) as indicated hereunder:

|       | 50 Km | 250 Km | 500 Km |
|-------|-------|--------|--------|
| E1 =  | 2     | 10     | 14     |
| E3 =  | 50    | 150    | 170    |

Accordingly, selecting higher than actually required rates would be prohibitive and one should find a solution for intermediate rates at affordable prices, i.e., optimize bandwidth occupation. A first solution that comes to a network designer's mind involves using multiplexing techniques, that is, for instance, cover a 10 Mbps bandwidth requirement with five multiplexed E1 in Europe or seven T1 in the US, or multiplex equivalent virtual channels within a high speed link.

Both hardware and software alternatives may be designed. However, hardware solution would suffer the drawback of both high development cost and time to market. Obviously, one would prefer keeping the already available network hardware architectures (e.g., node architectures) and shoot for software modification.

On the other hand any software implementation of such a multiplexing system should fit with the specific traffic requirements, including quality of service traffic granularity, etc . . . , in any variable and/or fixed length packet switching network, while requiring minimal development cost for implementation in already existing network architectures.

SUMMARY OF THE INVENTION

One object of this invention is a method and system for optimizing data communication network bandwidth occupation in a multipriority data traffic environment by simulating a high bandwidth link through multiplexing lower rate links or virtual channels, using software means fitted to already existing network architectures.

Another object is a method and system for simulating a high bandwidth link by multiplexing lower rate links or virtual channels, particularly suitable for mixed traffic including both variable length and fixed length types of randomly provided traffics.

Still another object is a method and system for simulating a high bandwidth link by multiplexing lower rate links or virtual channels and enabling random reservation of one of said links or channels specifically assigned a given task.

Still another object is a method and system for simulating a high bandwidth link by multiplexing lower rate links or virtual channels fitted to randomly provided traffics with several predefined Quality of Service (QoS) parameters.

A further object is a method and system for simulating a high bandwidth link by multiplexing lower rate links or virtual channels and enabling dynamic network bandwidth adaptations through preempt/resume operations.

A still further object is a method and system for simulating a high bandwidth link by multiplexing lower rate links or virtual channels and enabling dynamic network bandwidth adaptation through non disruptive preempt/resume operations.

The above mentioned objects, features and advantages are achieved in a method and system for optimizing data transmission link bandwidth occupation in a multipriority data traffic environment of a data communication network. A high bandwidth link is simulated by multiplexing said traffic over lower rate links or virtual channels. The data communication network includes network nodes interconnected by data transmission links, each said network nodes including input and output adapters interconnected to each other through a network switch. The data traffic is randomly provided to the network through fixed and/or variable length data packets. The method performed in the node transmission side or output adapter comprises the steps of:

storing said data packets into output queues selected according to a so-called Quality of Service (QoS) based on each said priority levels;

splitting each said data packets into so-called segments, each segment being provided with a segment header including:
 (a) a QoS flag defining the corresponding priority level;
 (b) a packet number reference;
 (c) a segment number reference;
 (d) an end of packet flag for identifying the last segment of a processed packet; and
 (e) validity control bits for header integrity control;

generating a Link Status Control Word (LSCW) including an at least one bit long flag per link, said flag being used to indicate possible link reservation and thus enable on request link masking;

generating a Link Availability Control word (LACW) including an at least one bit long flag dynamically settable during operation to indicate whether the corresponding link is currently available or busy;

performing a logical AND operation between said LSCW and LACW words for generating a global link availability control word; and monitoring and scanning said output queues on decreasing priority order and multiplexing the segments of said queued packets over said node output links or virtual channels based on said global link availability control word indications.

These and other objects characteristics and advantages will become more apparent from the following detailed description of a preferred embodiment of the invention when considered with reference to the accompanying figures.

DESCRIPTION OF THE DRAWING

FIG. 5 is a table of a Packet Transmit Control Block (PXCB) used in the network of FIG. 3.

DESCRIPTION OF A PREFERRED EMBODIMENT

As already mentioned, the invention should be implementable on any network link and therefore it should be controlled from within any network node, be it an access node or an intermediate transit node. In presently available digital networks, each node includes switching means in between receive and transmit adapters. In the preferred embodiment of this invention, the data arranged into packets of either fixed or variable length within the adapters, shall, anyway, be split into fixed length segments (except for the last segment of the packet which might be shorter than said fixed segment length), dispatched through the switching means via switch interface means.

Figure 1:
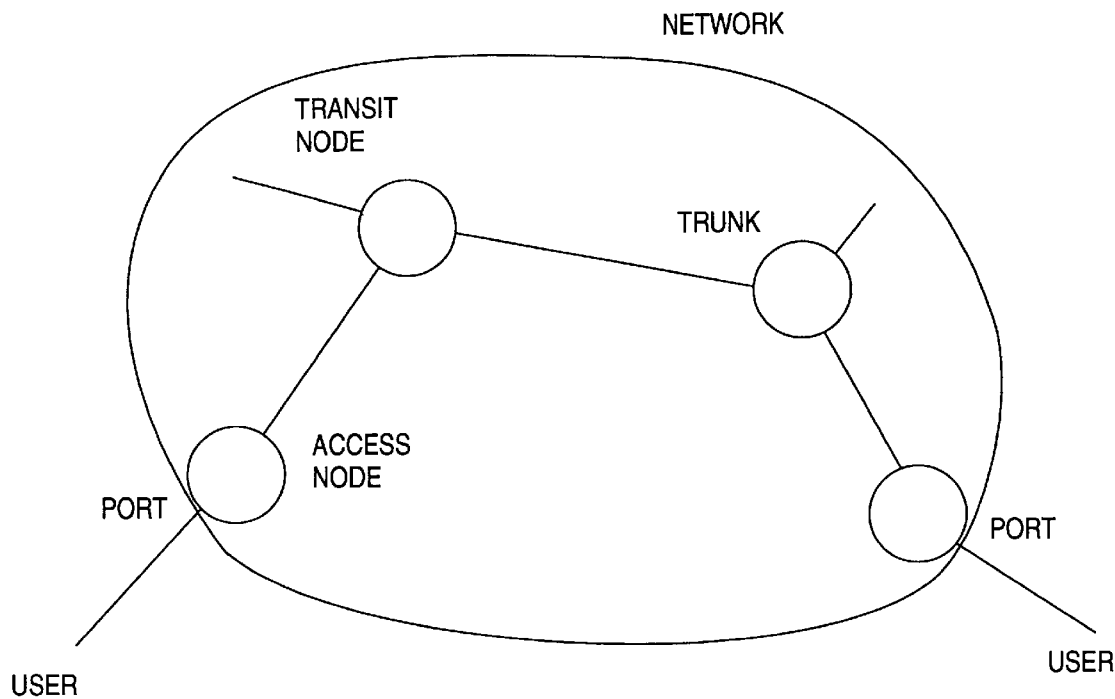
FIGS. 1 and 2 are prior art representations of data networks wherein the invention is implementable.
Figure 2:
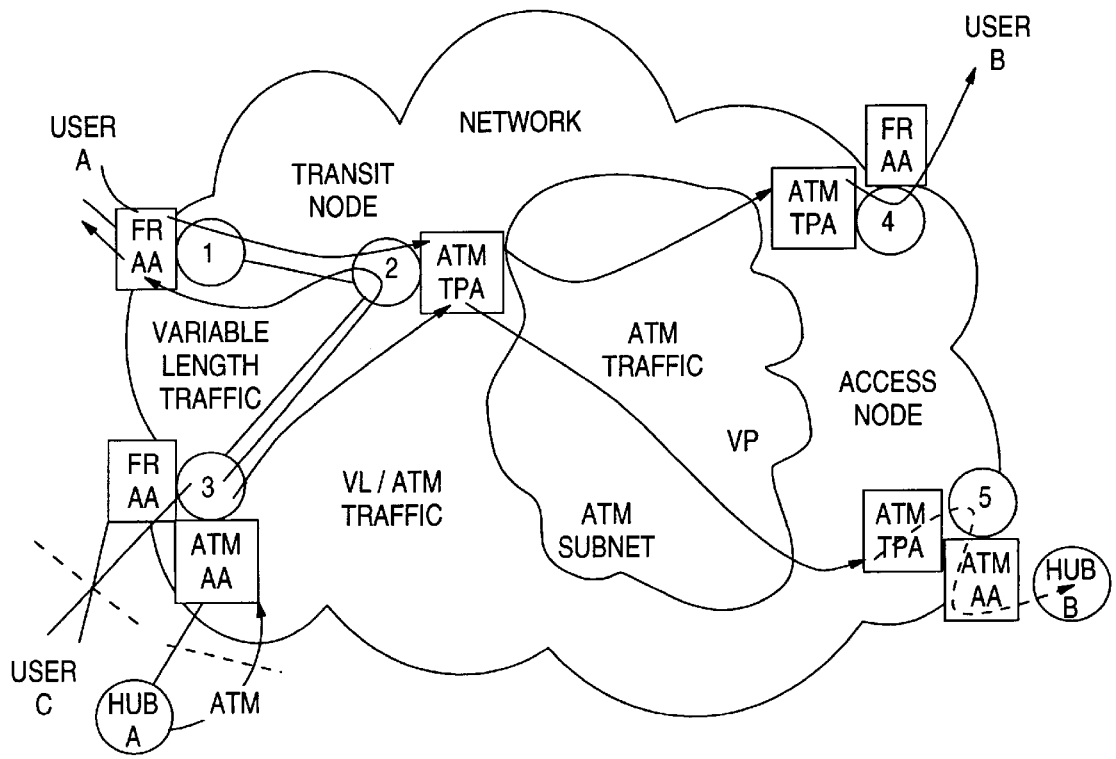
Figure 3:
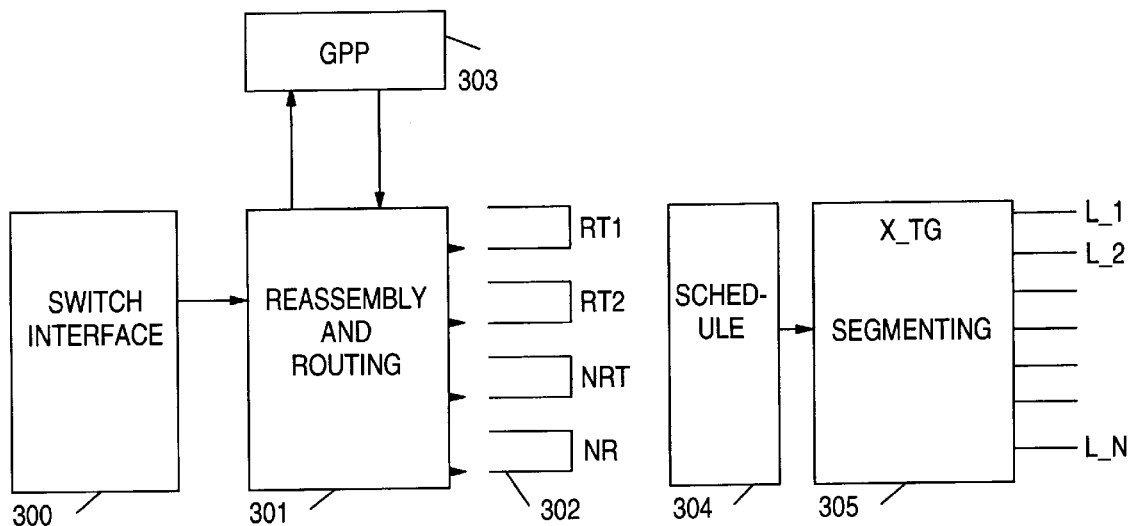
FIG. 3 is a schematic representation of a network node output adapter incorporating the principles of the present invention.

FIG. 3 shows a schematic representation of a network node transmit adapter side wherein the packets/segments are provided through switch interface means 300. The segments, if any, may need first be supplied to reassembly unit 301 and then routed toward a queuing means 302 selected according to the specific Quality of Service (QoS) assigned to the processed data.

For illustration purposes, four priority levels based on Quality of Service (QoS) have been defined which include:

RT1 and RT2 for real-time type of traffic with two different relative priorities, RT1 bearing the highest priority level.

NRT for non-real-time traffic (e.g., pure data for batch traffic).

NR for non-reserved traffic.

Typically, the highest priority classes (RT1 and RT2) are used to transport voice or video that does not suffer being delayed above a predefined delay. Non-real-time is used to transport interactive data. Non-reserved traffic, used for file transfer for instance, is assigned the lowest priority level. In addition, some control data may require being forwarded to a general purpose processor 303 controlling some of the network operations. These control data may therefore just leave the transmission path at the considered node level.

The above-mentioned priority criteria, while they complicate the invention mechanism are of a high interest since they introduce important constraints in the final method to be developed. For instance the queues shall be served in a scheduler 304 with preempt/resume function facilities, to be described hereinafter.

Accordingly, the packets queued therein are split into segments, each segment being assigned a segment number between zero and N, N being equal to the maximum expected packet length divided by the predefined segment length according to the required bandwidth. The scheduler 304 cooperating with a transmission group segmenting device 305 sequentially scans the considered packet queued, segments these packets and assign each of these segments to an available output line/virtual channel L1,L2, . . . Ln. Preferably all multiplexed links should be conFigure d at the same transmission rate. To define the channel availability a n-bits long Line Availability Control Word (LACW) is defined, with each bit position being dynamically set either to one to indicate that the corresponding link (channel) is available, or to zero for unavailable link, i.e. for a channel being currently active or transmitting data. Also, any of the n link/channels must be momentarily reservable for a specific assignment, be candidate for a preemption operation or be physically dropped, etc. Therefore, the Link Availability Control Word (LACW) shall be masked by an n-bits long Line Status Control Word (LSCW). Each LSCW bit position is either set to one for enabling conditions or to zero for disabling. In a preferred embodiment, the LSCW shall be handled by already existing network facility assigned to line resources management, while the LACW shall be handled by the transmission program to be described herein.

In operation, LACW and LSCW may handle groups of trunks (physical and/or logical) instead of a same trunk. For instance, a first part of a given LACW/LSCW might belong to a first group, while the second part would belong to a second group. In this case, each group defines an aggregate trunk. At the system transmit side, the group is selected according to a routing table for a given packet connection identification. Accordingly, a so-called group number (gn) parameter should be added to the segment header.

Finally, a global link availability for the multiplexing operations is defined through logical ANDing of both LACW with LSCW control words.

Also, in practice, each of the n links might be taken at random based on availability criteria over the total line or trunk bandwidth. Accordingly, the LACW might be longer than n, and the required n links/channels shall be selected at random over the total available channels.

In operations, the processed data packet is split into segments and each, segment shall include a 4 bytes long header and 60 bytes (or less in case of the last segment of a processed packet) be reserved for the segment payload. In the preferred embodiment, the segment header includes:

QoS: 2 bits coding RT1, RT2, NRT and NR, i.e, 00 is for RT1, 01 for RT2, 10 for NRT, and 11 for NR.

Packet number: 7 bits for coding the packet number.

Segment Number: 6 bits for coding the segment number

L: 1 bit set to one to indicate whether the considered segment is the last segment of the considered packet.

Time stamp: 15 bits for time stamping and transmit time and header integrity check.

By comparing the "L" bit value and corresponding segment number, the system shall be able to check whether the packet was fully received or not.

Let's now focus on the transmit operations as implemented in the preferred embodiment of this invention.

Figure 4:
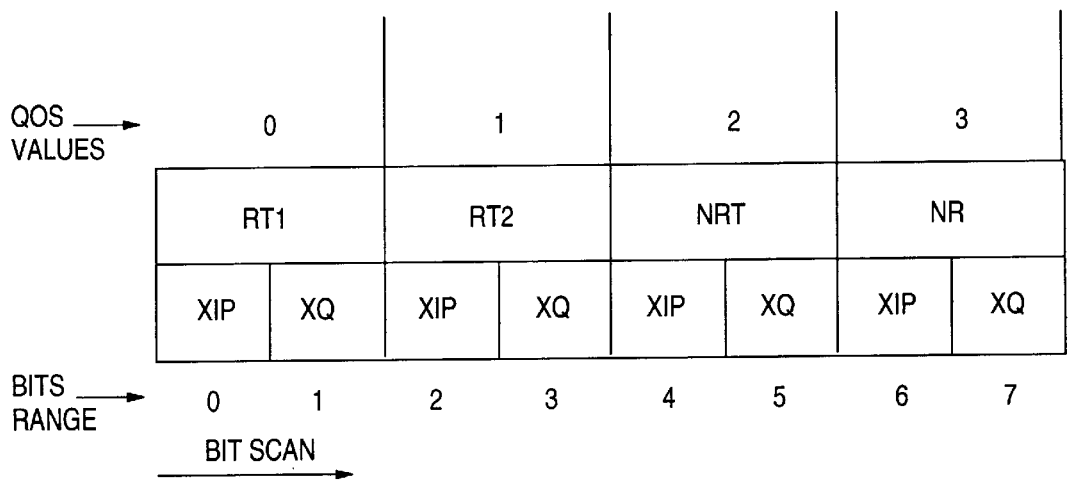
FIGS. 4 is a table of a Transmit (XMIT) Status Byte used in the network of FIG. 3.

To that end, some facilities shall be defined. These include first a Transmit (XMIT) Status Byte organized as represented in FIG. 4. Let's assume the XMIT Status Byte is scanned from bit position zero to bit position seven. Each bit position is used either to define a so-called Transmit In Progress (XIP) flag or a so-called Transmit Queue (XQ) flag. Each Quality of Service (QoS) 20 is assigned two consecutive bit positions, one for XIP and one for XQ. The XIP flag bit being OFF indicates that no packet transmission is in progress; it is set ON to indicate that a packet transmission has been started, i.e., at least its first segment is transmitted. The XQ bit being OFF indicates that the related QoS XMIT queue is empty, while it shall be ON when at least one packet is stored in corresponding transmit queue. The transmit queues are coded as follows:

| - RT1 | Real Time 1 | (QoS "00") | for highest priority |
| - RT2 | Real Time 2 | (QoS "01") | |
| - NRT | Non Real Time | (QoS "10") | |
| - NR | Non Reserved | (QoS "11") | for lowest priority |

In FIG. 5, a Packet Transmit Control Block (PXCB) includes six bytes per Qos to keep record of the numbering of the corresponding packets and segments as well as pointers to packet list. It should be noted also that the packet list is a list of sixty segment pointers, each pointing to a buffer where the data of the corresponding packet segment have been received from the node switch and stored. Each buffer has been made sixty four bytes long, sixty bytes being used for segment data and four bytes for segment header. The header bytes position are initially empty. The XMIT Packet List, sixty through sixty three are used for storing packet information such as: packet routing information, packet length, packet assignment such as network control, etc..

Let's now proceed with describing the flow charts detailing the transmission operations as implemented in the preferred embodiment of this invention. Given these flow charts, a person skilled in the programming art shall be able to write the programs driving the transmission process without any inventive effort being required from his part.

Figure 6:
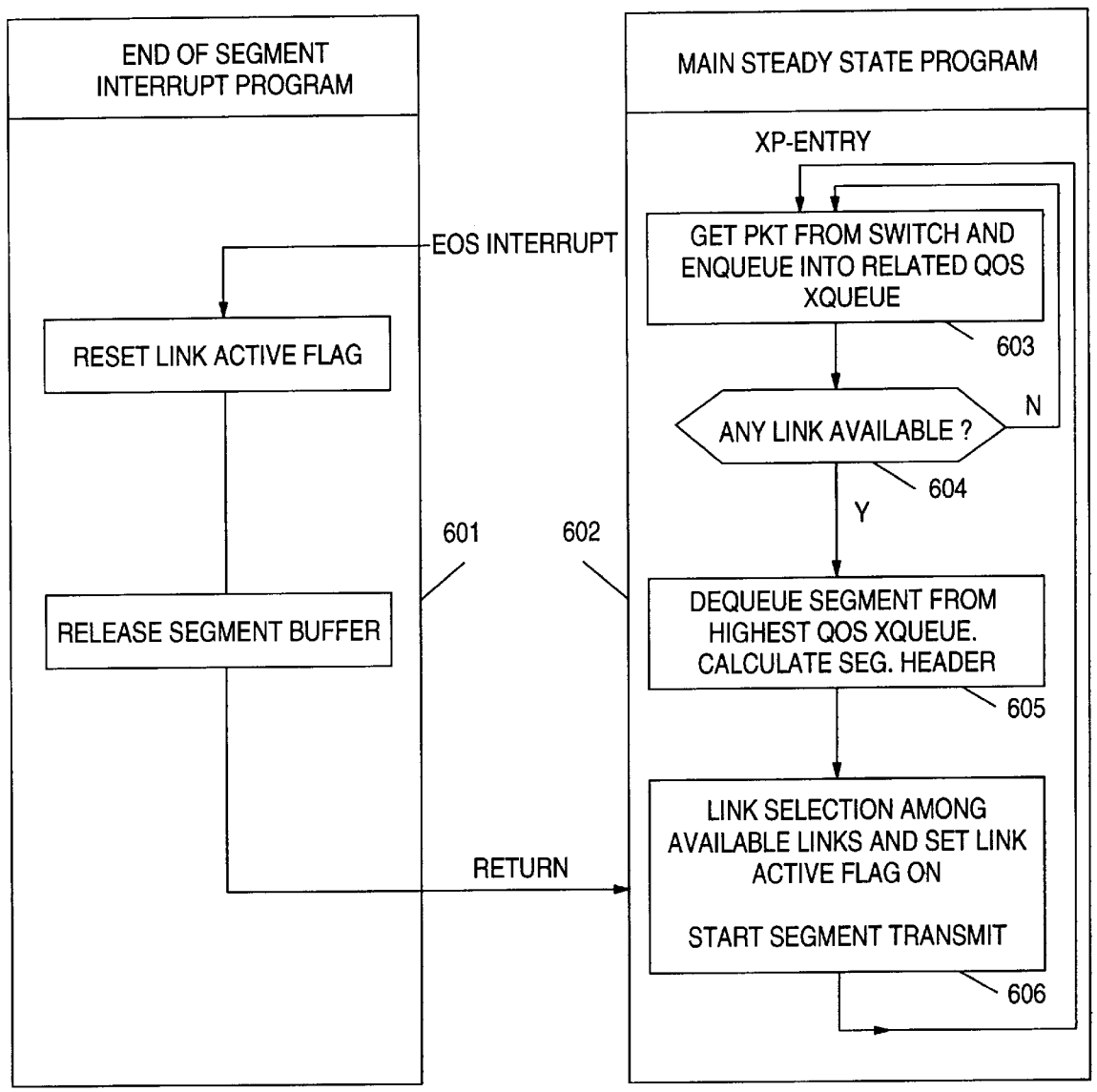
FIG. 6 is a block diagram of a transmission flow chart for implementing the invention in the system of FIG. 3.

FIG. 6 shows the general flow diagram for the transmit operations. FIG. 6 includes both high priority tasks for End Of Segment (EOS) interrupt program 601, and low priority tasks 602 for the main steady state program. At End Of Segment (EOS interrupt), the Qx value related to a link index (1x), (see FIG. 7) resets the related link active flag and releases the corresponding segment buffer, before returning to the main steady state program. The steady state program starts with an operation 603 getting a packet from the Switch and enqueuing it in the corresponding QoS transmit queue. A test 604 is then performed to detect whether a link is available. If not, the process loops back to the start operation 603, otherwise, the program proceeds to an operation 605 to dequeue a segment from the highest QoS transmit queue and calculate the segment header (i.e., the already mentioned four bytes) for feeding the header in the buffer pointed at by the segment pointer of the transmit packet list. Finally, a link selection operation 606 is performed for selecting a link among the available links and setting the corresponding link active flag to start segment transmission prior to looping back to the start operation 603.

Figure 7:
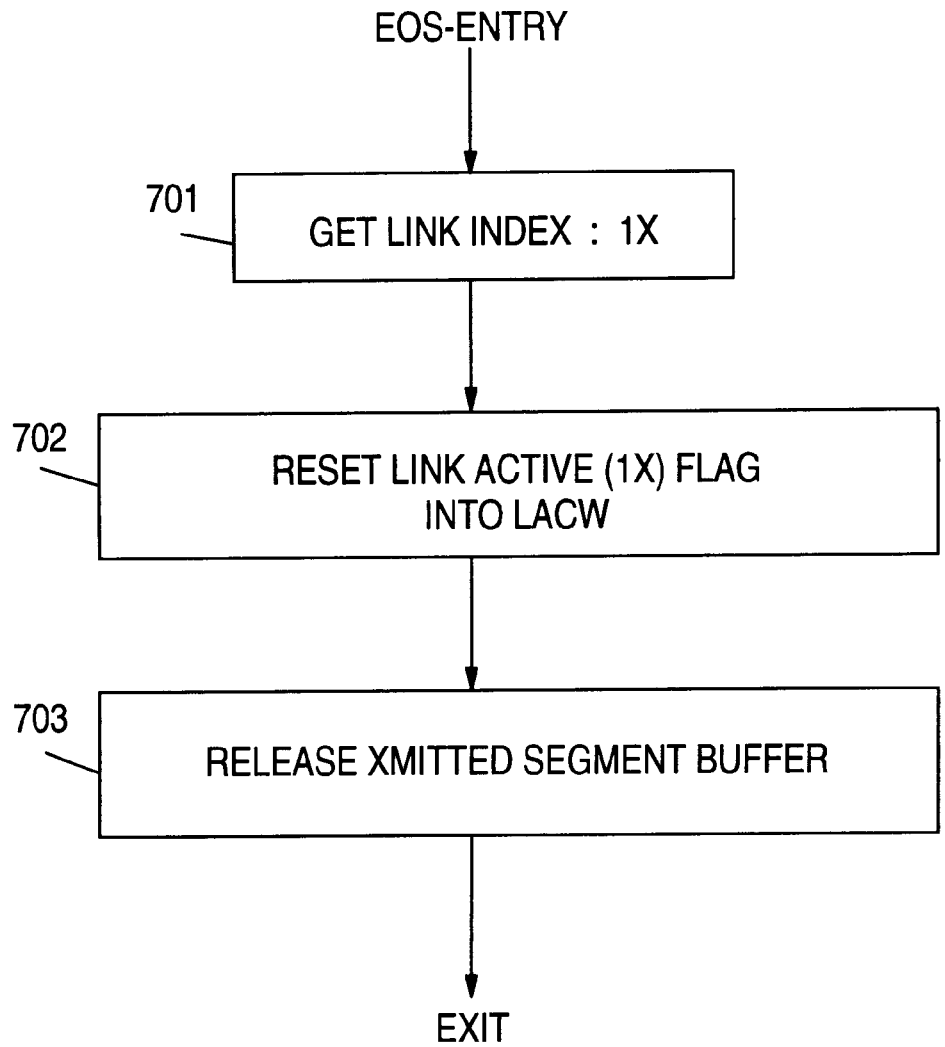
FIGS. 7 through 10 are detailed flow charts for implementing the invention on the transmission side of a network node.

FIG. 7 shows the flow chart for the End Of Segment interrupt program shown in FIG. 6. First a link index (1x) is provided in an operation 701 by hardware means for addressing the Link Xmit Control Block (LCB). Then an operation 702 resets the Link Active flag accordingly, by setting the LACW bit(x) OFF. An operation 703 releases the transmitted segment buffer, prior to going back to the main steady state program 602.

Figure 8:
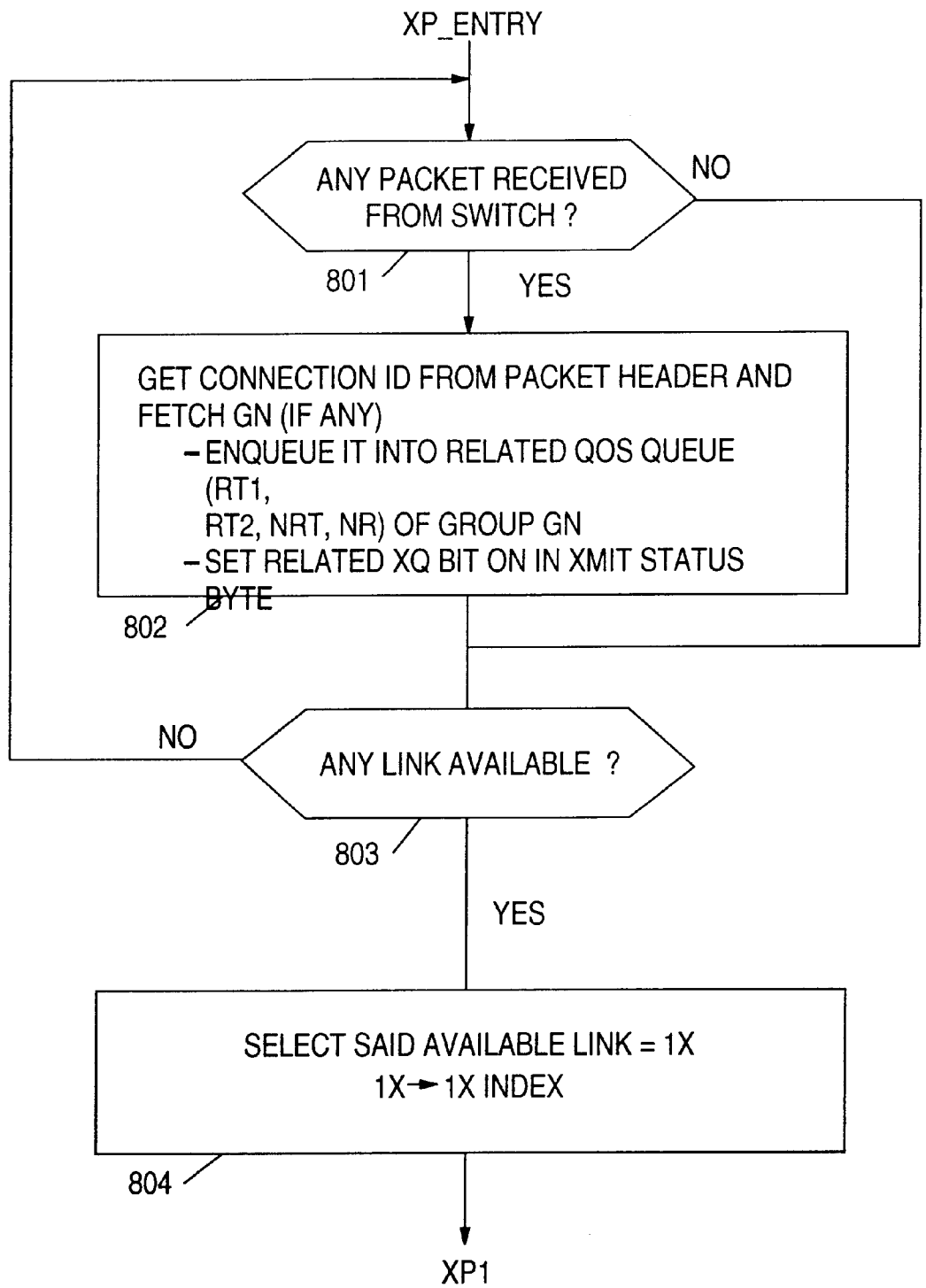

In FIG. 8, the main steady state program operation starts with an operation 801 checking whether a packet has been received from the node switch. If yes, then said packet in an operation 802 is enqueued (after getting connection identity from the packet header and fetching group number gn from a routing table) into one of the queues based on the packet QoS parameter. The operation 802 might, naturally be combined with any existing mechanism for regulating the queues levels. Once a packet is enqueued, the XQ flag bit is set ON in the transmit status byte to indicate the presence of said packet in the queue. A test 803 is performed on a global link availability control word obtained by ANDing the Link Status Control Word with the Link Available Control Word, to check whether a link is available for transmission. The link availability test 803 is also performed in case of a negative response to test 801. Otherwise, the first available link is selected and its index is recorded in an operation 804, after which the program transfers to processing the transmit status byte XP1.

Figure 9:
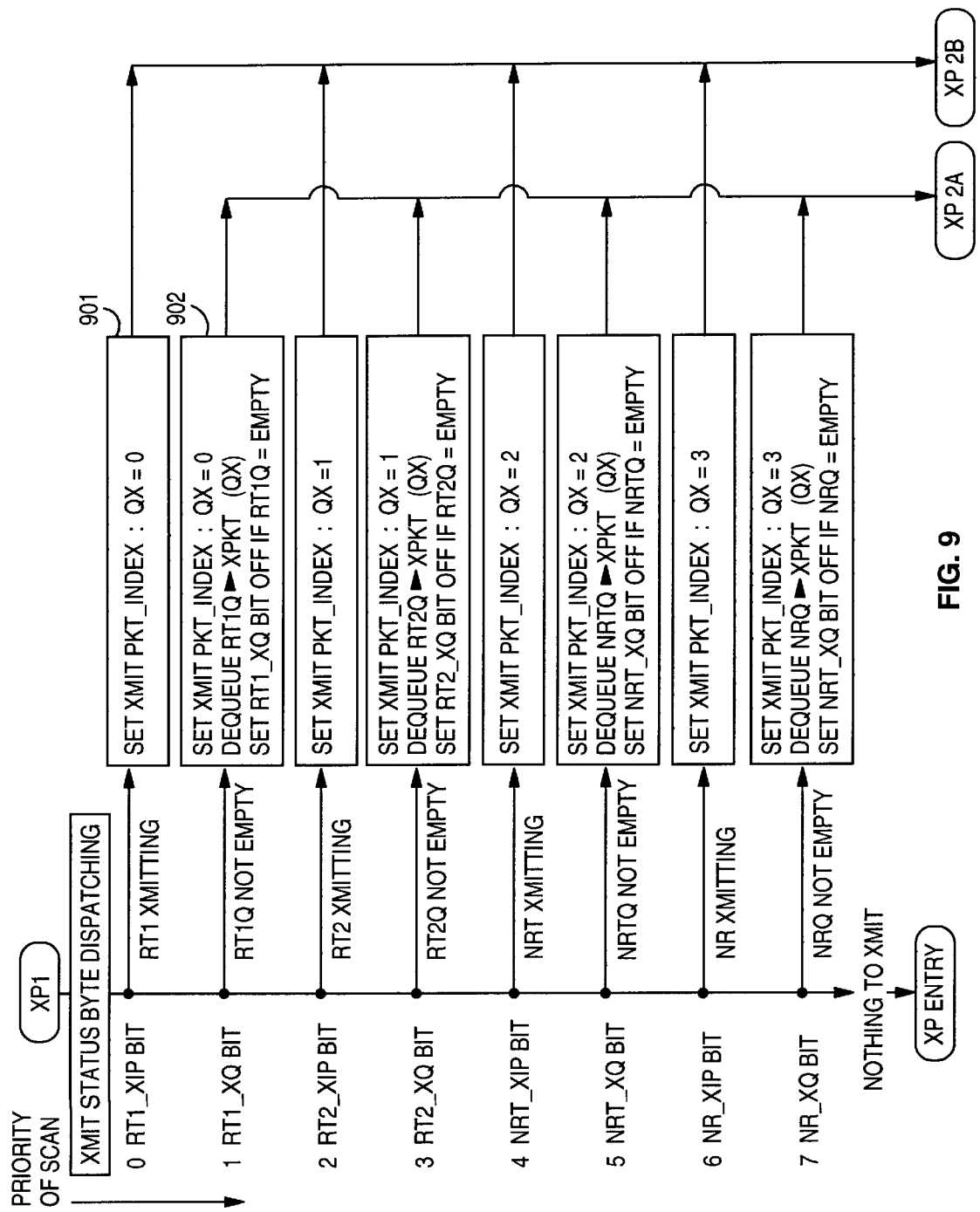

In FIG. 9, the transmit status byte XP1 is scanned in decreasing priority order, i.e. from QoS=00 to QoS=11 and more precisely from bit range zero to seven in the XMIT Status Byte. For each priority, two sets of operations 901/902 might be performed. The operation 901 indicates a packet of related QoS is transmitting. The operation 901 includes preparing Qx index for processing the related PXCB (continuing transmission) and then branching to XP2B. The operation 902 indicates that at least one packet is ready for being transmitted from related QoS. A Qx index is prepared for processing related PXCB (starting transmission of a packet). Additionally, if the queue, after extracting, is empty, XQ flag is set to zero. Naturally, if scanning the transmit status byte in decreasing priority order fails to stop on any of said priorities, the process exits, i.e., returns to the operation 801, otherwise it branches either to (XP2A) for a new packet, or to (XP2B) for a new segment being transmitted, as will be described in FIG. 10.

Figure 10:
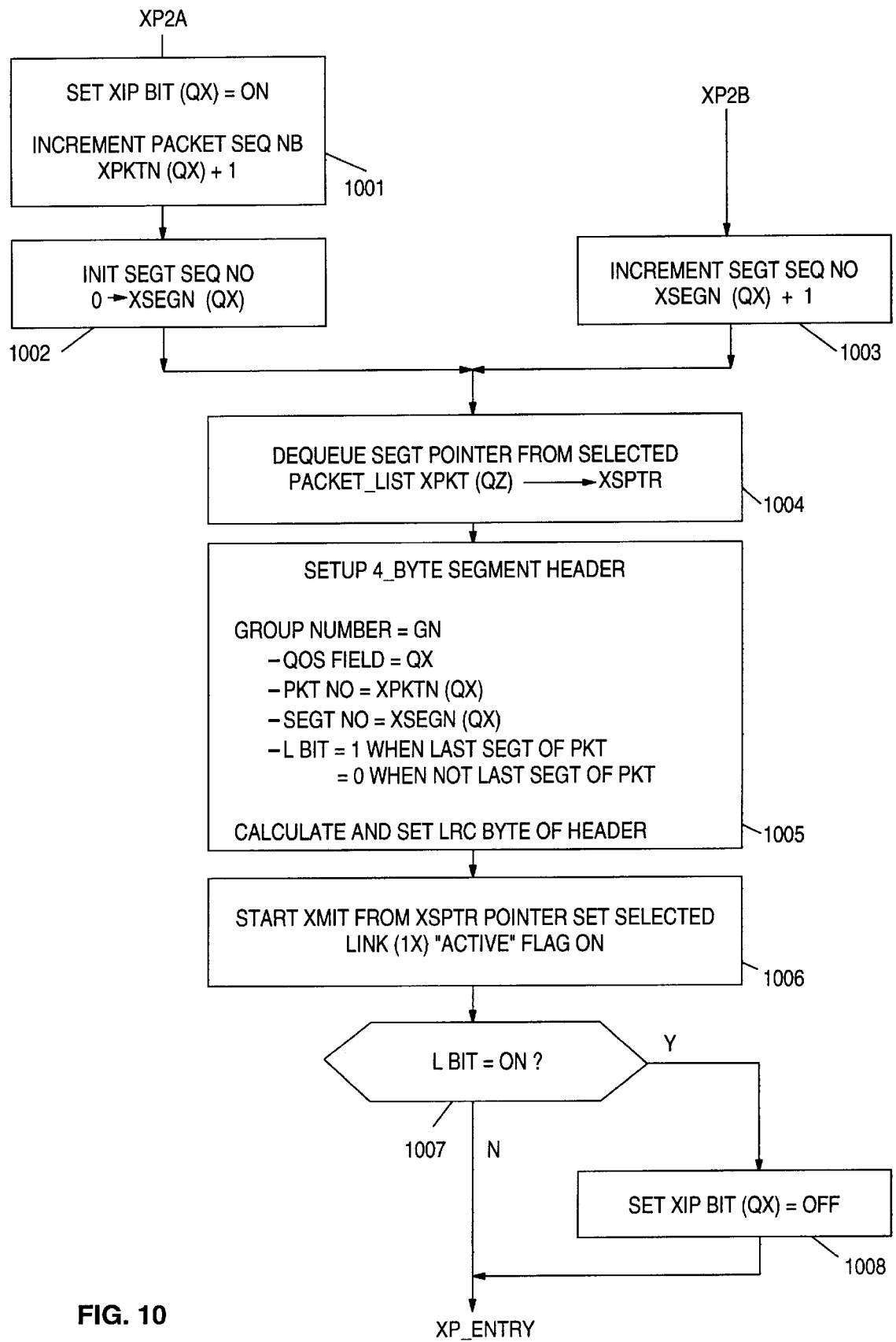

In FIG. 10, for a new packet, the related XIP bit is set ON, the packet sequence number as indicated by the XPKTN counter is incremented for the considered priority queue in an operation 1001. Then the segment sequence number counter for said considered priority is initialized in an operation 1002. If the packet transmission already started, (XP2B entry) the process would only need incrementing the segment sequence number counter in an operation 1003. Then, in both cases, that is either after 1002 or after 1003 the process goes to an operation 1004 for dequeuing a segment pointer from the selected packet list XPKT and starts an operation 1005 for constructing the four bytes long segment header. The quality of service field of said header is filled with the considered QoS; the packet number and segment number fields are filled with the content of the packet number counter and segment number counter fields, respectively. The bit L field defining last segment of packet is either set to zero or to one accordingly, L=1 identifying a last segment. Finally the header integrity control byte is calculated by XORing all other header bytes as already mentioned.

Transmit operations 1006 proceed with starting transmission position pointed at the XSPTR pointer position. The link active flag is set ON in the 1x position of the Link Active Control Word.

A test 1007 is then performed to detect whether the current segment is the last segment of the packet being transmitted. If not, then the process loops back to the operation 801 (see FIG. 8). Otherwise, a new packet is made ready for transmission in the considered Quality of Service and, to that end, the xIP bit is set OFF in the transmit status byte accordingly.

Figure 11:
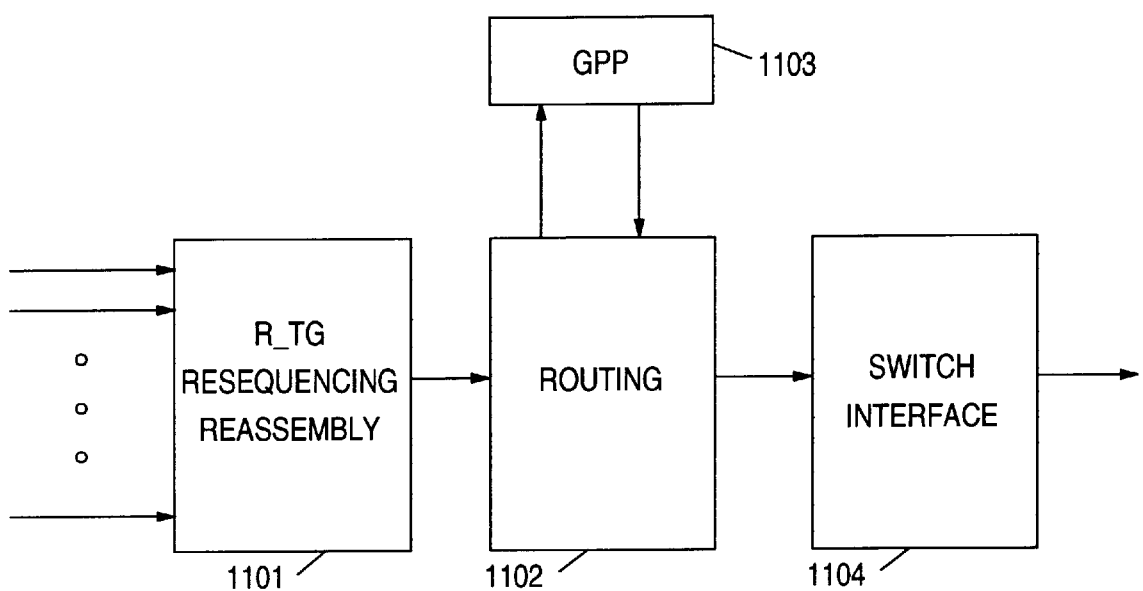
FIG. 11 is a block diagram schematically representing the invention on a network node receiving side.

In FIG. 11, receive operations are shown as implemented in the preferred embodiment of this invention. First, a receive processor 1101 properly resequence and reassembles the segments into their original packet form. This part is the most complex of the receive process. Then a routing processor 1102 directs the segments toward the already mentioned General Purpose Processor 1103, for control traffic data for instance, or toward the Switch Interface 1104. The processors match perfectly with the existing node architecture as disclosed in the copending European Application, filed on Jul. 20, 1994, and entitled "Multipurpose Packet Switching Node for a Data Communication Network", Publication Number 000079065.

Figure 12:
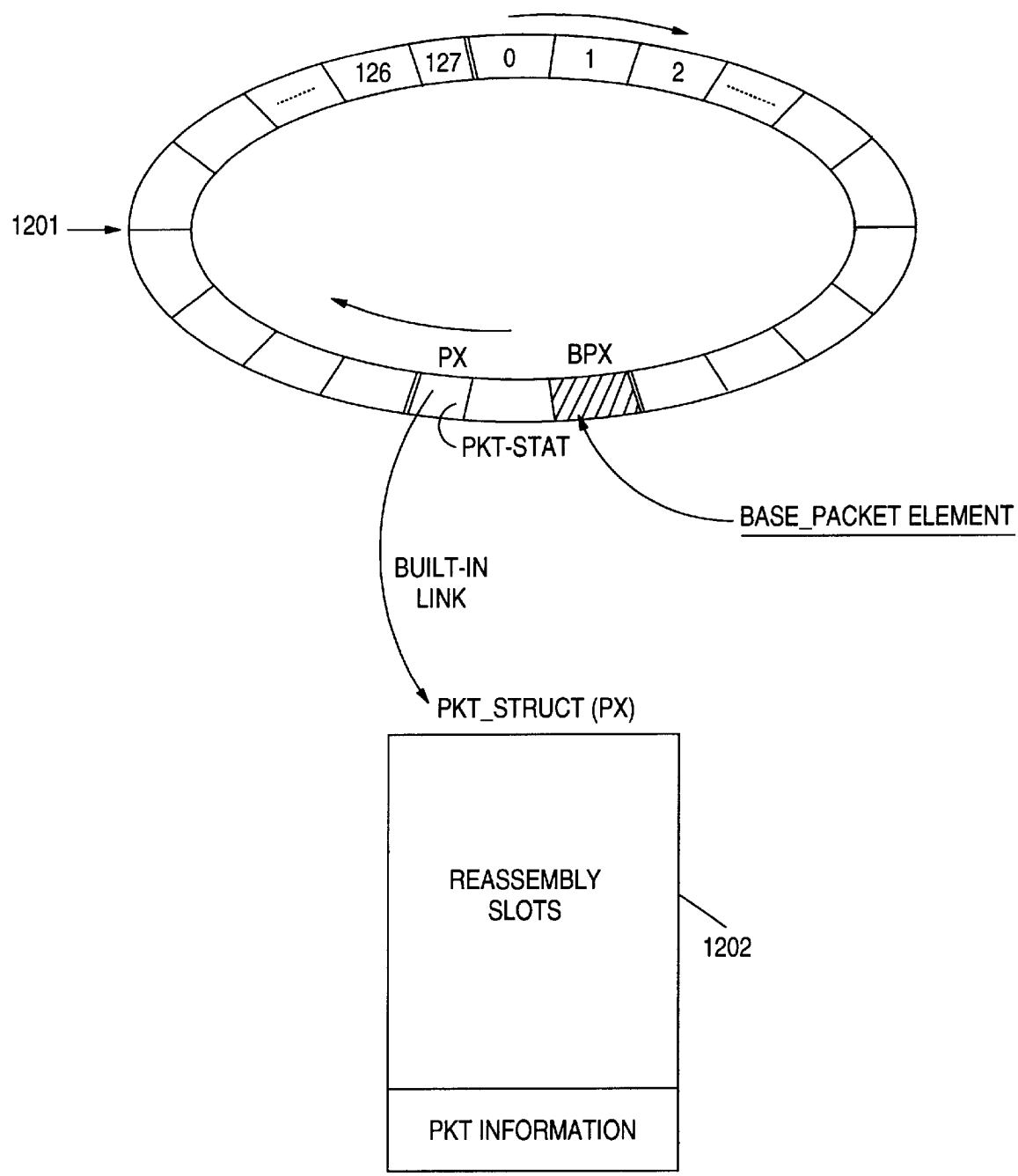
FIG. 12 shows a representation of a ring organization to be used for the reception of a given traffic priority.

In FIG. 12, the basic principle of the receiving operations is represented for one Quality of Service (QoS). In other words, the complete system shall be made to include as many of the represented elements as there are defined QoS, e.g., four for the best mode of implementation, i.e.: RT1, RT2, NRT and NR. Each QoS is thus provided with a ring (1201) split into 128 ring elements for packet status (PKT-STAT) which ring elements are numbered sequentially zero to 127.

Each ring element is associated a buffering zone named Packet Structure (Px) 1202 and packet information mapped into the Packet Structure. Each ring element contains also so-called Status Flags including:

RIP: Reassembly In Progress flag which is set ON when receiving a first segment (Nota Bene : not necessarily the segment numbered zero, since segments could be received at random) of a new packet. The RIP flag is set OFF when flushing the received packet for any reason including error or transfer of complete packet from the Packet Structure into a corresponding Switch Output Queue (SOQ).

FLUSH: Flush flag is set ON when, for example, a time-out is detected (time-out parameters shall be defined to avoid jamming the system with incomplete packets due to any kind of transmission failure). Flush flag is set OFF when the first segment of a new packet for the same ring element arrives as shall be indicated by parameters including an RCF variable.

PKT-COMPLETE: This flag is set ON when all segments of a same packet have been received as indicated by counters including SEGCTR and EXPCTR (defined below).

EOP: End Of Packet flag is set ON when last segment of a packet (L flag ON) has been received.

A built in connection is designed for relating any given Ring Element to a Packet Structure. The Packet Structure zone has been made to include sixty-four, 4-bytes long, slots: sixty slots (i.e., numbered zero to fifty-nine) being reserved for the segments and four slots (sixty to sixty-three) for packet information. The packet information includes:

The segment counter (SEGCTR) counting the number of segments received for a same packet.

The expected number of segments counter (EXPCTR) in a packet. EXPCTR is set ON when receiving the segment marked "L" (last) in the 4-bytes long segment header. The segment sequence number of this segment indicates how many segments should be received for the considered packet. When SEGCTR=EXPCTR, the packet is complete.

A Ring Cycle value at packet flush time (RCF) is initialized at so-called flush flag setting ON time, and used for distinguishing a flushing packet from the new one which should occupy same ring element (same packet number modulo 128).

In fact, the receive Packet Structure is addressed by the packet number index (px) pointing to related packet ring element. The index is formed with the seven bits long packet sequence number value extracted from the four bytes long segment header. The oldest packet, as indicated by the lowest packet number, in Receive In Progress (RIP) state is referred to as a base packet and is identified by its packet index (bpx). The receive Packet Structure is made to store segment pointers only, which pointers shall point to a buffering zone within a RAM of the node adapter. Each segment pointer is addressed by a slot number or segment index (Sx) formed with the six bits long segment number value extracted from the four bytes long segment header. When empty, a slot contains zeros. The RAM buffering zone enables storing at least 60*60 bytes=3600 bytes for the packet data bytes.

Once a packet is complete, the above described PKT_STRUCT should be cleared for receiving a next packet while the system might not be ready for passing the completed packet to the network node switch. Accordingly, the buffering means (PKT_LIST) is used wherein the corresponding packet information is transferred. The information includes the general packet information such as destination, length, etc . . . and the first to last segment pointers pointing to the RAM zone storing the segment payloads for next transmit queuing.

Figure 13:
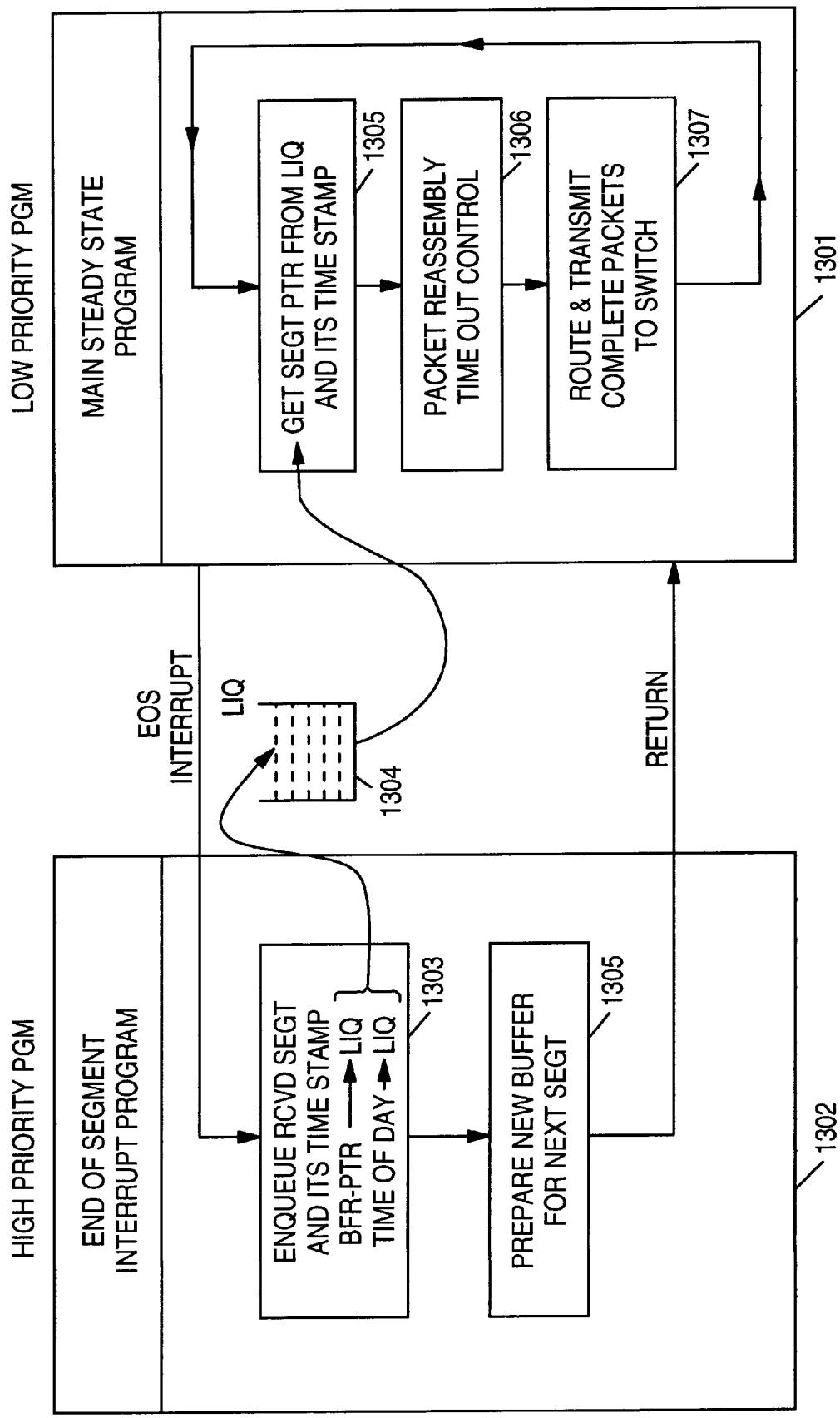
FIG. 13 is a schematic representation of a general flow chart for receiving data according to the invention.

In FIG. 13, the general flow diagram for receive operation is schematically represented. The receive operation includes both low priority operations 1301 for the main steady state program and high priority tasks 1302 for processing end of segment interrupts. At end of segment (EOS) interrupt, a received segment is properly enqueued and time stamped in an operation 1303, the enqueuing identifying the QoS involved and addressing the receiving system including ring and associated elements. A buffer pointer is enqueued in a Link Input Queue (LIQ) 1304 together with a time stamp, i.e., time of day (TOD) provided by the system timer at each end of segment received. A new buffer is prepared for a new segment in an operation 1305 prior to the process branching back to the low priority program 1301 of the main steady state program.

Basically, the low priority program of the steady state program performs three basic sets of operations, namely:

Getting a segment pointer and its time stamp from the line input queue in an operation 1305;

Reassembling the packet and controlling any possible time-out in an operation 1306; and, Routing and transmitting the complete packets, e.g., towards the node switch in an operation 1307.

Figure 14:
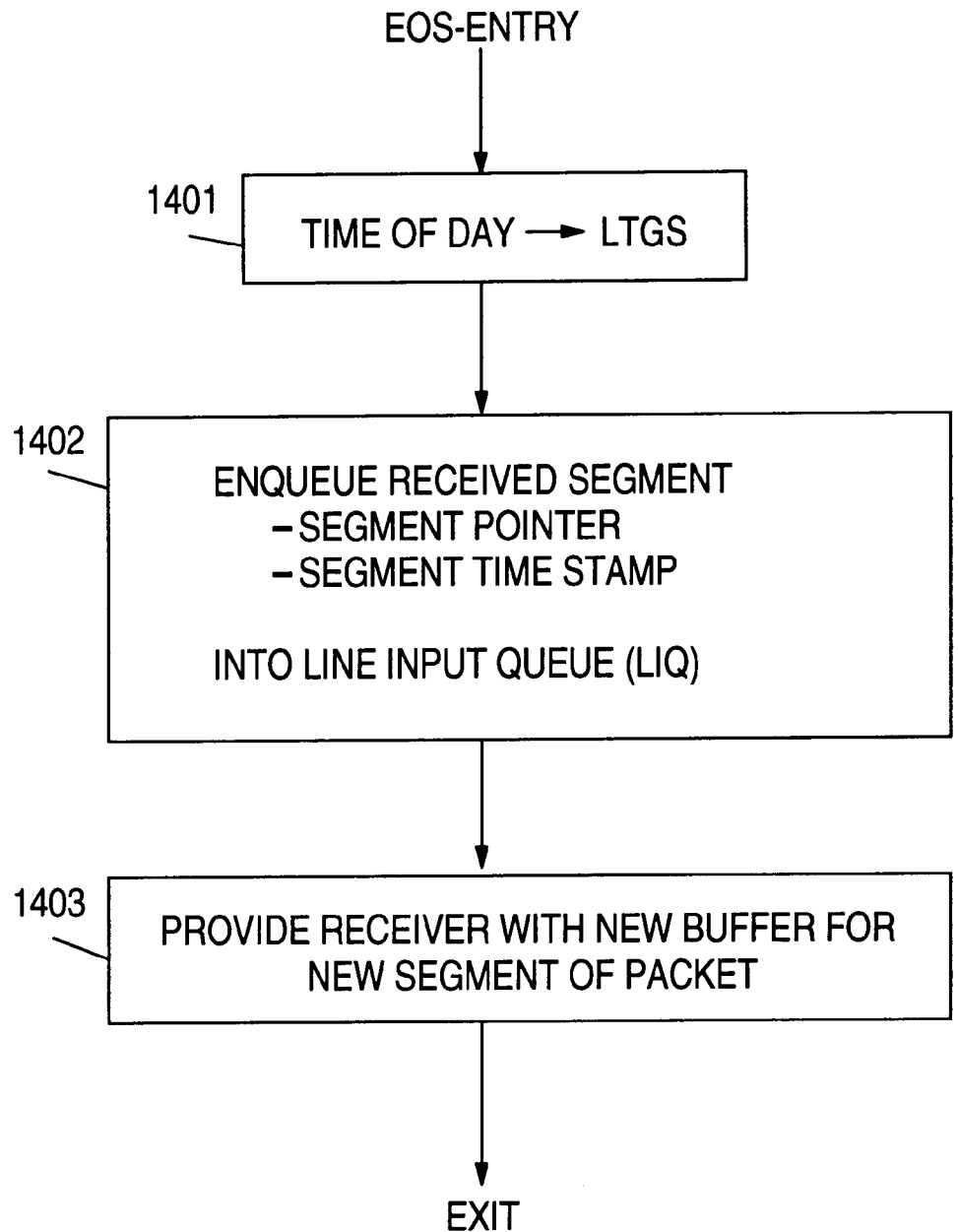
FIGS. 14 through 21 are detailed flow charts for implementing the operations of FIG. 13.

In FIG. 14, the high priority tasks 1302 are further described starting in an operation 1401 using the actual time indicated by the system timer as a Last Global Time Stamp (LGTS). The LGTS is thus refreshed with the internal timer value every time a segment is received, i.e., when branching to the EOS interrupt program. In an operation 1402 the received segment is properly enqueued into the Line Input Queue after being provided with a segment pointer and a receive time stamp. A new buffer is prepared for next segment of the considered packet in an operation 1403 and the process branches to the main steady state program. Naturally any errored segment has been discarded.

FIGS. 15 through 21 implement the main steady state program by further detailing the process of operations 1305 through 1307 described in FIG. 14.

Figure 15:
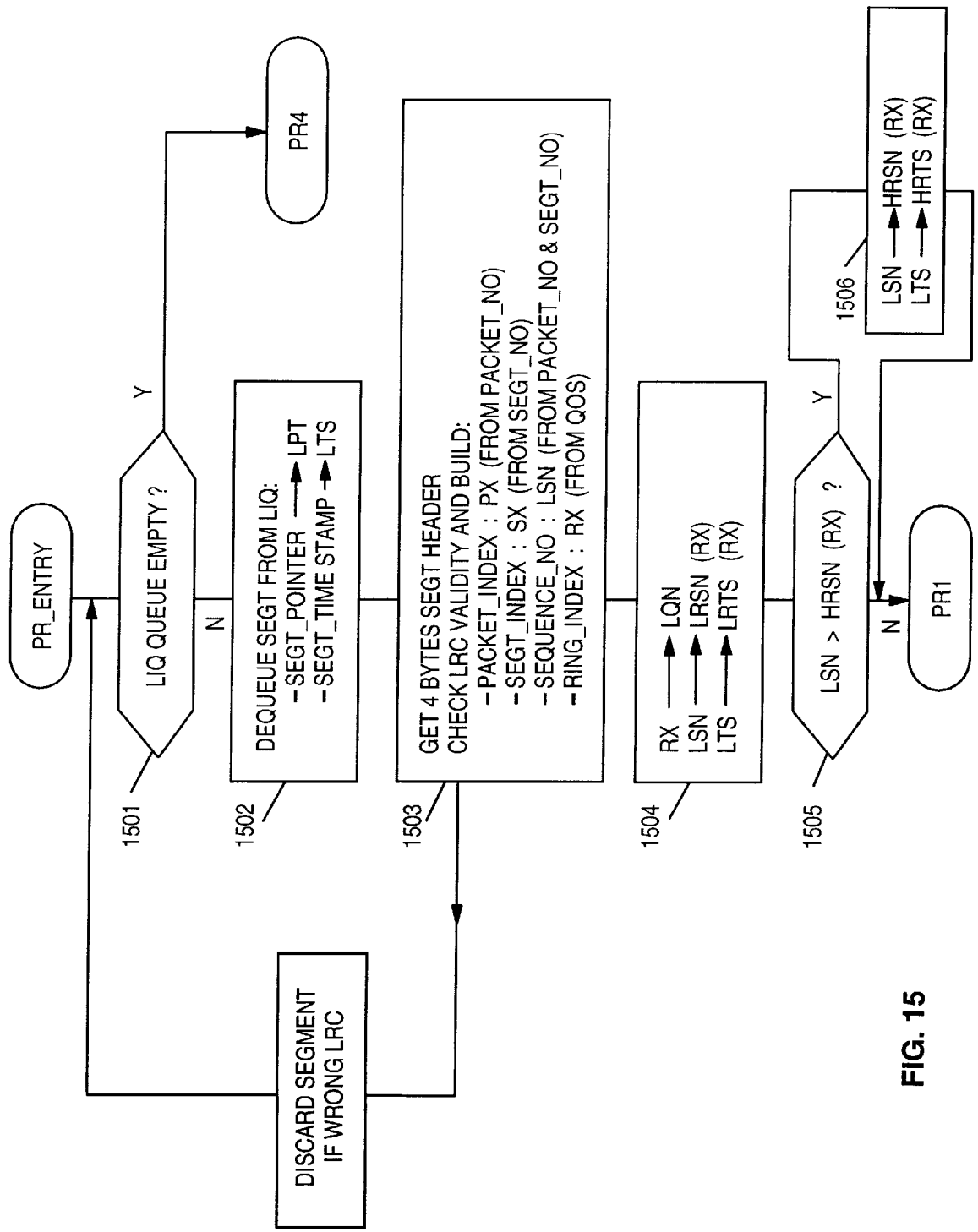

In FIG. 15, after entry point PR_ENTRY, the process starts in an operation 1501 by checking the line input queue for highest priority, and then in decreasing priority order, to detect whether said checked queue is empty of segments. Should the queue be empty, then the flow chart branches to PR4 to be described later on. If at least one segment is present in the queue, the segment is dequeued in an operation 1502 and its segment pointer is stored as Last Received Segment Pointer (LPT) pointing to the 64-bytes buffer where the segment data have been stored. Also, the dequeued segment is set and stored as Last segment Time Stamp (LTS).

An operation 1503 involves setting internal program variables from the 4-bytes long segment header, after checking the header validity according to the fourth header byte, and discarding wrong LRC checked segments. For valid segments processed, the variables include a packet index (px), a segment index (sx), a sequence number (LSN) and a ring index (rx). The packet index is used for pointing to related packet ring element and Packet Structure and Packet Status. The packet index is formed with the seven bits long segment header. The segment index (sx), used for pointing to the related Packet Structure slot number, is formed with the six bits long segment sequence number value extracted from the four bytes long segment header. The ring index (rx) is formed with the two bits long quality of service parameter extracted from the four bytes long segment header. Finally, a Last Segment Sequence Number (LSN) is detected through concatenation of the six bits of the segment sequence number to the seven bits of the packet sequence number.

In an operation 1504, the ring index (rx) selects among rings RT1, RT2, NRT and NR and is used to memorize the value of QoS of last received segment which shall be used, later on for performing so called packet time-out determination (see FIG. 20). The LSN and LTS are used in the operation 1504 as Last Received segment Sequence Number and Last received segment Time Stamp, respectively.

In an operation 1505, the highest received sequence number of the ring is updated. To that end the Last received Sequence Number (LSN) is compared to the Highest Received Segment Sequence Number (HRSN). Should LSN be lower than HRSN(rx), then no updating is necessary. Otherwise, the HRSN(rx) and its Time Stamp are updated in an operation 1506 and the process branches to routine PR1 of FIG. 16.

Figure 16:
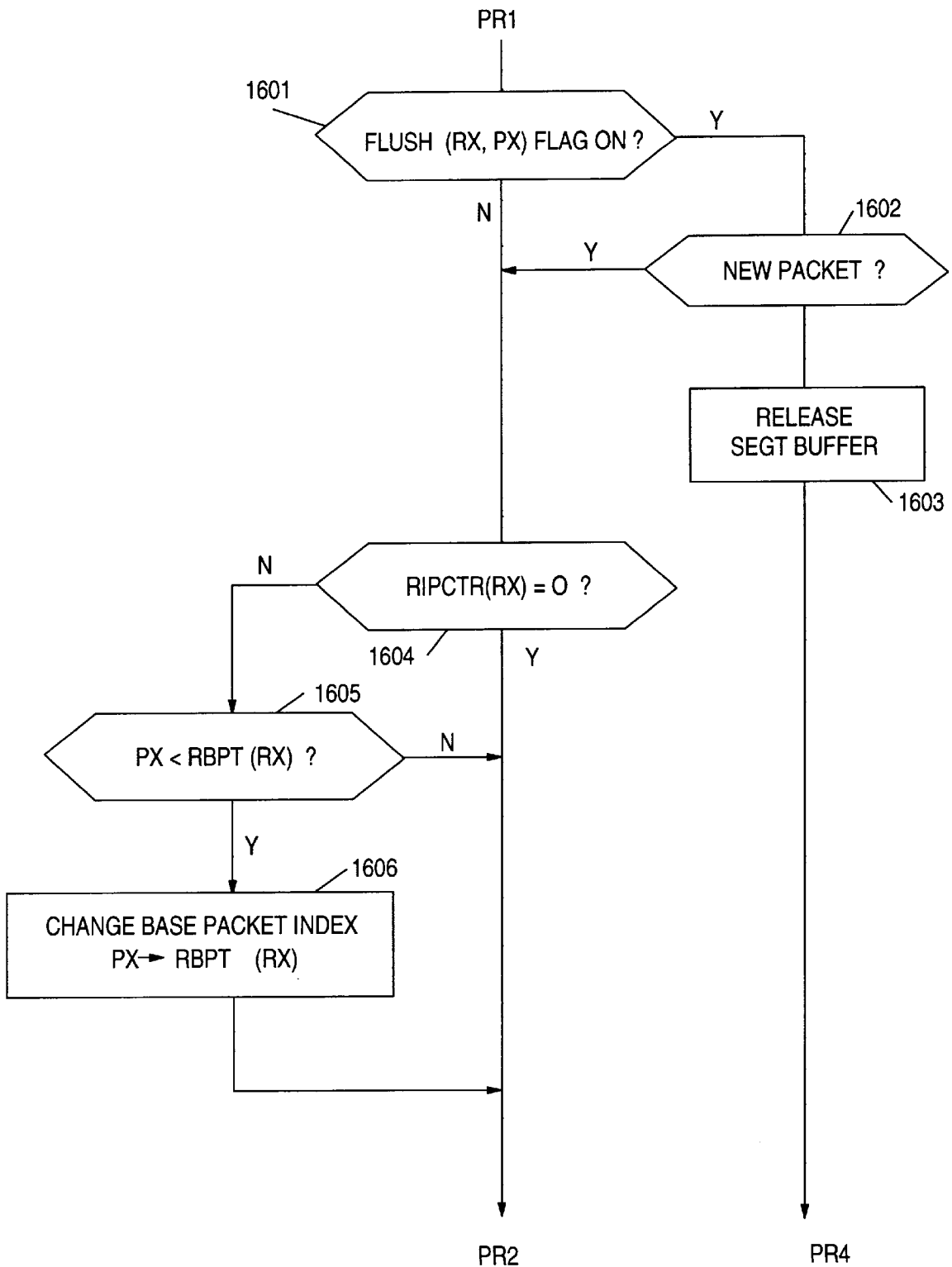

In FIG. 16, the PR1 routine starts with an operation 1601 checking whether the flush flag for the considered ring index and packet index is ON. If yes, then the system is in a flushing packet status (to be detailed later on in this description) and all segments belonging to the considered packet are discarded. To that end, the process checks whether the considered packet is a new packet in an operation 1602 (i.e., same packet number +128), if not, then the segment buffer is released in an operation 1603 due to continuing flushing condition for a considered ring slot, and the process branches to PR4, to be described hereinafter. Otherwise, the flush status is considered old in the operation 1602 and a new packet needs be processed, the process branching to the same routine as the one following an OFF flush flag detection in the operation (1601). A test (1604) determines whether the ring is empty, in other words no ring slot is occupied in the ring. If yes, as indicated by the counter counting the number of packets in reassembly state as marked by a RIP flag ON in the considered ring, the process branches directly to PR2. Otherwise, another test is performed in an operation 1605 to check whether the current packet index, modulo 128, is lower than the Ring Base Packet.

In other words, it should be noticed that at any time there is an oldest packet in reassembly status in each ring, such packet is called a Base-Packet of the ring. As long as the Base-Packet is not complete, all subsequent packets, even if complete, cannot be sent to the node switch preventing packet desequencing. The base packet index needs, naturally, be updated in an operation 1606. Then if px<RBPT(rx), px replaces the Ring Base packet Pointer (RBPT(rx)), after which the PR1 routine branches to PR2, as it also does for a negative test 1605. The base packet has been updated and the ring origin is known.

Figure 17:
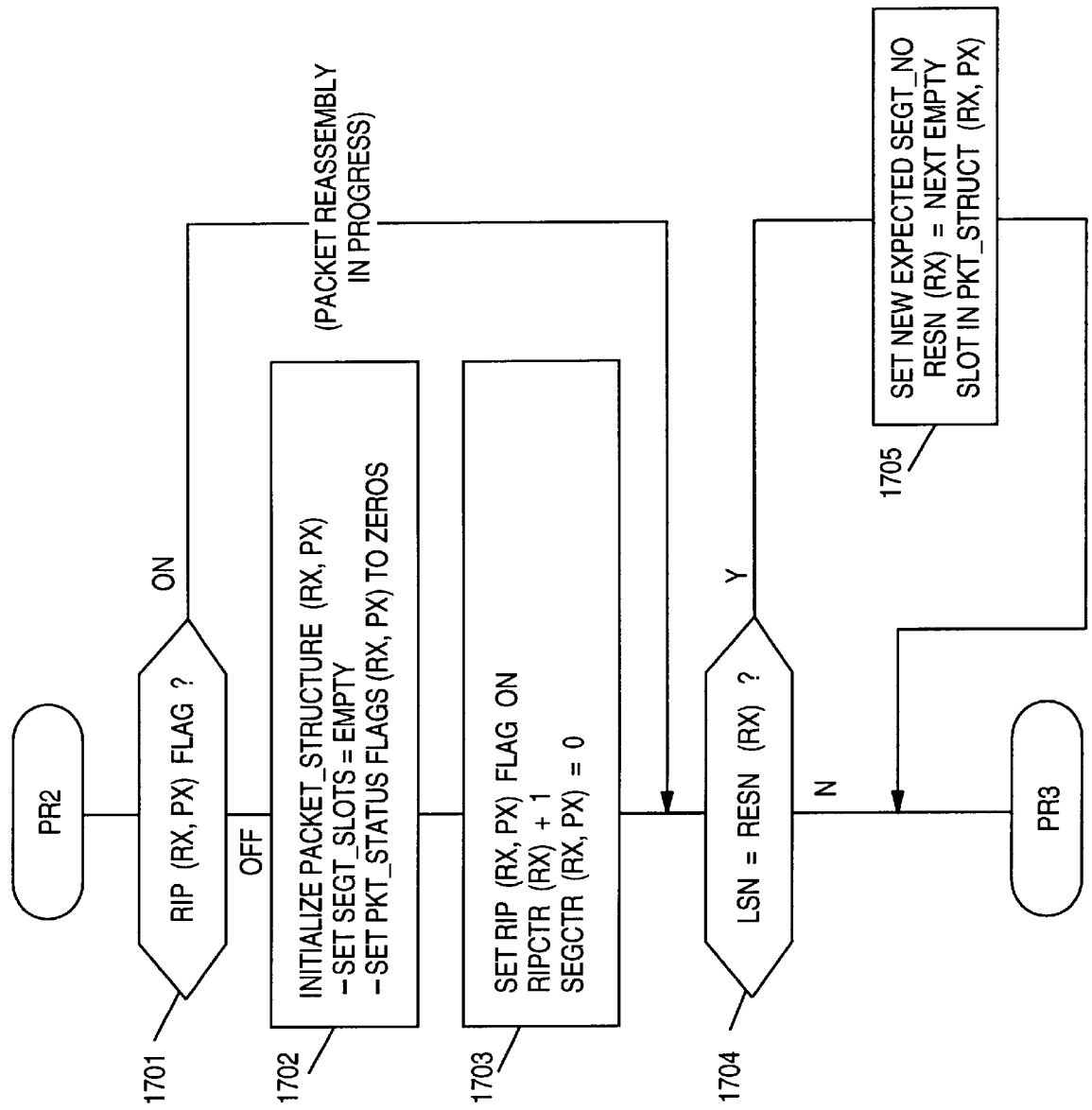

In FIG. 17, the PR2 routine starts with an operation 1701 checking whether current received segment starts a new packet or not, by testing the RIP(rx,px) flag. If OFF, a new packet is starting, then the designated Packet Structure should be prepared in an operation 1702 by emptying the segment slots and setting the Packet Status flags to zero. The system may then update the counters in an operation 1703 and after setting the RIP flag ON, the count of packets in reassembly state in the considered ring is incremented and the segment count for the considered packet is reset to zero. Now, should test 1701 indicate a flag ON, or once the operation 1703 is performed, a test 1704 is performed to check whether the Last received segment Sequence Number, obtained by concatenating the six-bits long segment sequence number to the seven-bits long packet sequence number is equal to the Expected segment Sequence number, i.e., the lowest segment number not received yet, that is still being waited for, for a base packet. If the test 1704 is yes or positive, then this expected segment was just received. The RESN is refreshed in an operation 1705, and RESN(rx) is set to the value of the next empty slot in the Packet Structure for (rx,px), after which the PR2 routine branches to PR3, as it also does when the result of test 1704 is no or negative, which indicates that the expected segment (lower segment number) was not yet received.

Figure 18:
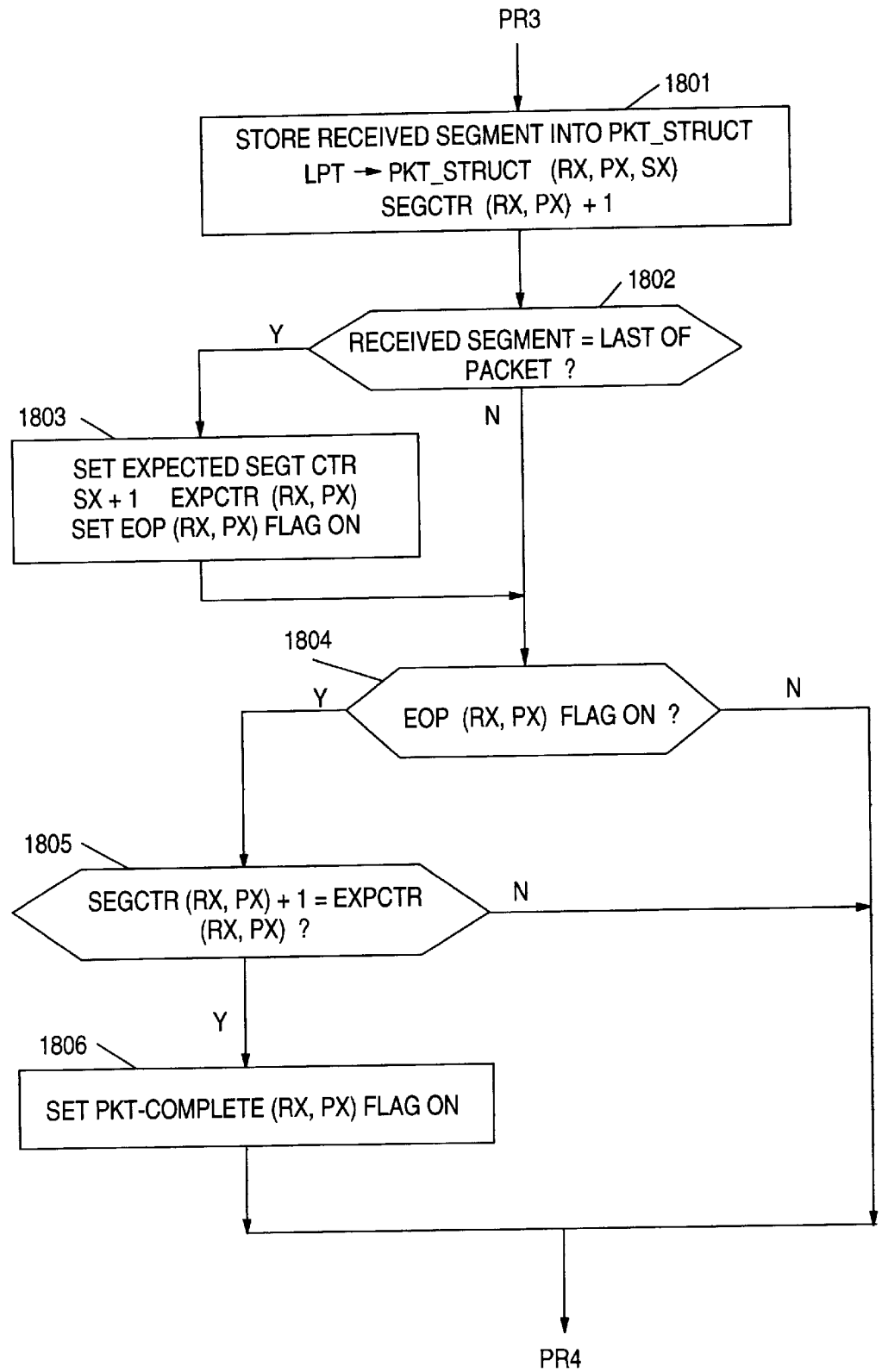

In FIG. 18, the PR3 routine starts with an operation 1801 storing received segment pointer in the Packet Structure, as already defined; updating the count of number of segments received for a considered packet,. and updating the last received segment pointer. The received packet is tested in an operation 1802 for an End Of Packet (i.e."L") flag. If the "L" flag is set identifying a last segment, the system knows then in an operation 1803 the number of segments that should have been received for the considered packet. The expected segment counter is loaded accordingly and the End Of Packet flag bit is set ON. If the operation 1802 is negative the process transfers to an operation 1804 in which the EOP flag is ON. When the segment counter count plus 1 is found equal to the Expected segment counter count in an operation 1805, then the packet is complete. Accordingly, the flag identifying a complete packet is set ON in an operation 1806 and the process branches to PR4. Otherwise, should tests 1804 or 1805 be negative, the PR3 routine branches also to PR4 for clearing the ring and associated structure for complete packets or timed-out packets, that is incomplete packets which have been waiting too long (i.e., over a predefined time threshold) in the ring.

Figure 19:
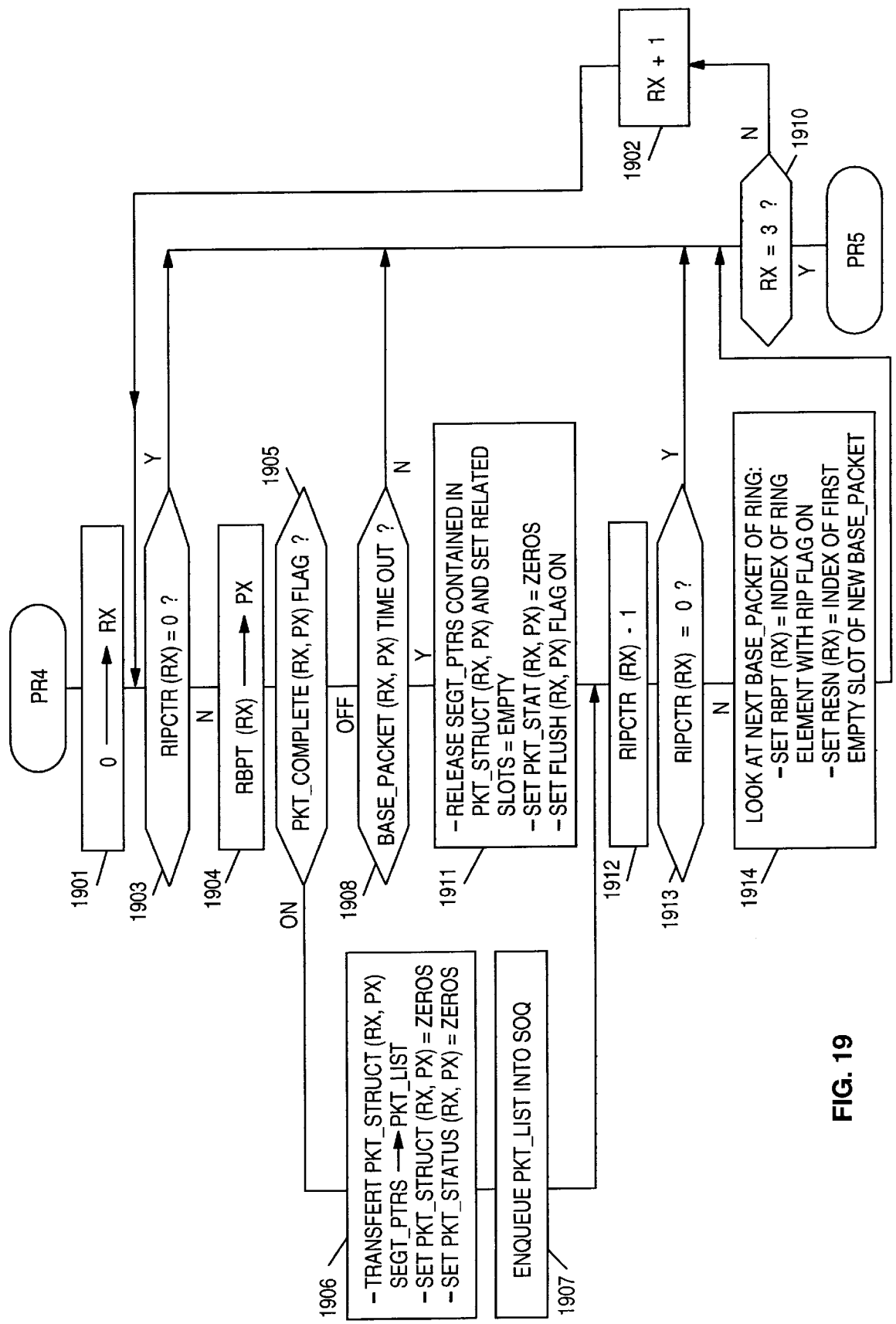

In FIG. 19, the PR4 routine addresses the four priority rings in an operation 1901 by setting rx to zero and incrementing it progressively in an operation 1902 up to the highest ring, e.g., rx=3. If the ring is empty, as indicated by a test (1903), then the PR4 routine transfers to PR5 as soon as rx=3 in an operation in an operation 1910. If the ring is not empty, px is set to the ring base pointer in an operation (1904). The flag indicating a complete base packet is tested 1905, since as long as the base packet is incomplete, and unless time is out, the packets younger than the base packet are not transferred to the node switch. Then, assuming the flag indicating a complete base packet is ON, the base packet structure is transferred into the Packet-List, and the Packet Structure and Status are cleared in an operation 1906. Then the packet is enqueued in an operation 1907 into the Switch Output Queue.

But should the flag, as tested in 1905 be OFF then a test 1908 on incomplete packet is performed to detect whether a time-out condition occurred. (This parameter shall be described with reference to FIG. 20). If not, the PR4 routine branches to next ring as long as rx is not equal to three 1910. Otherwise, in case of time-out, then in an operation 1911 the segment pointers are released accordingly and the ring slot is emptied; the Packet-Status is set to zero and the flush flag is set ON accordingly.

The count of number of packets in reassembling state in the ring, as marked by a RIP flag ON, is decremented in an operation 1912. The same operation is also performed after the operation 1907. The count, once decremented, a test 1913 is made versus emptiness. Should the ring be empty, the routine branches to the 1910, otherwise a reinitialization of base packet (i.e., actual base packet) in reassembling state in the ring is performed in an operation 1914. The ring base packet pointer is set and the index of first empty slot (lowest segment number of segment not received yet) belonging to the base packet, is detected and its index stored.

As already mentioned, system jamming has been made avoidable by defining time threshold(s) which should not be exceeded during packet receiving and assembling. A corresponding so-called time-out control mechanism is designed accordingly, as represented in the flow chart of FIG. 20.

Figure 20:
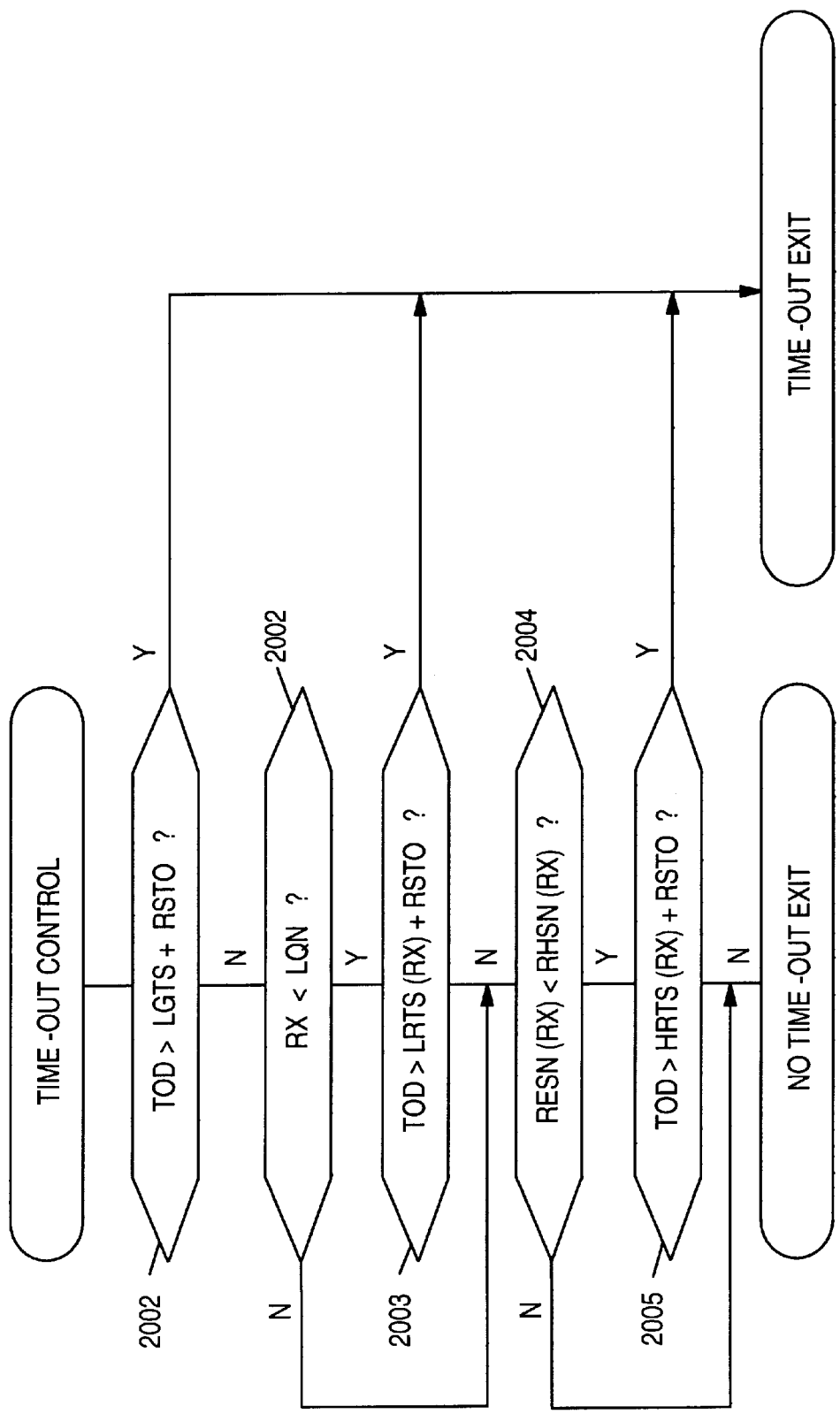
Figure 21:
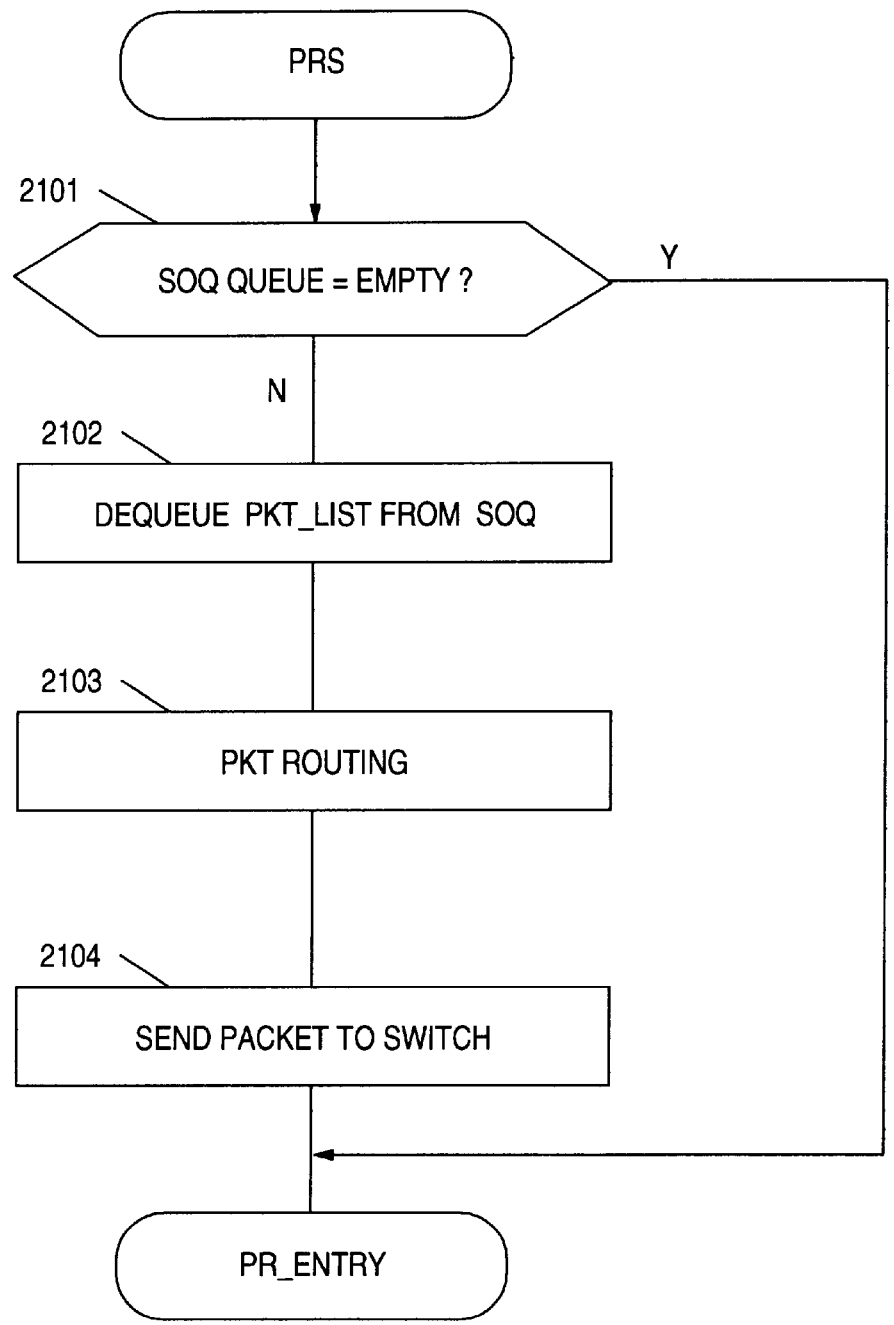

In FIG. 20, to help understand the time-out control mechanism operation, let's first define the rules selected in the preferred embodiment of this invention, for determining that a packet has been waiting in the ring for too long and should be discarded. Accordingly, the following rules apply:

1) A segment "n" should arrive at destination before:
   Time Stamp of segment "n+1"+RSTO wherein RSTO, i.e. Received Segment Time Out is based on the addition of:
   theoretical propagation delay over one trunk (T1/E1 for instance) of a 64 bytes long segment of packet; plus,
   a correction value, i.e., a tolerance, due to the different transmission rates on each trunk, or clock variations.

This means that, when a segment "n+1" has arrived, the segment "n" should not be too late. For instance, let's assume a 64-bytes long segment "n" is sent over link 1, then a 5 bytes long segment "n+1" is sent over link 2. Segment "n+1" shall arrive before segment "n" but the maximum delay for receiving segment "n" should be equal to the Transmission delay for a 64 bytes long segment + correction value DELTA (predefined value).

2) Due to preemption rules applying on the transmit side for QoS priority purposes, a packet may stay in Receive In Progress, and not complete, state for a time higher than RSTO when higher QOS segments have been interleaved in the transmitted traffic. Accordingly, in case of reception interruption for a predefined, say 2 RSTO for instance, packets in RIP status and not complete should be flushed.

Let's now consider the Time-Out Control flow chart of FIG. 20 detailing the operation 1905 in FIG. 19. First in an operation 2001 if current time as read in the system timer at end of segment reception is greater than Last Global Time Stamp plus a predefined time threshold, herein selected equal to two times the so-called Receive Segment Time Out value, then no reception occurred for a while and time-out is verified, upon which the routine exits. Otherwise a new test is performed in an operation 2002 testing for inter-ring time-out. Normally, when reception switches to a lower priority, then the higher priority reception should be over. The operation 2002 is made to check whether the reception switched to a lower priority or not while still expecting segments. If it did switch, then in an operation (2003) the time-out checking should be performed on the Last Received segment Time Stamp on ring rx, with the threshold set now to RSTO. If this test is positive, indicating that a low priority segment was received before getting rid of higher priority, then time-out occurred. Otherwise, the routine branches to a new test 2004, as it also does for a negative 2002 test. The test 2004 is made for intra-ring time-out control. It checks whether the lowest segment of a given sequence number not yet received in a base packet in ring rx is older than the highest received segment sequence number, said sequence numbers being defined by the concatenation of the six bits long segment number to the seven bits long corresponding packet number. If not, then no time out occurred. Otherwise a time-out check is performed in an operation 2005. In other words, a positive test 2004 indicates that a time-out rule should be applied (i.e., 2005). If the Time Of Day (TOD) is higher than the predefined time-out parameter (RSTO) added to the receive time stamp (HRTS) of the Highest Received segment Sequence Number as defined by the concatenation of highest received segment number appended to the corresponding packet number, then the expected segment has not been received in time, i.e, time is out. Otherwise as also when test 2004 is negative, no time-out occurred and the process may go on.

Turning to FIG. 20, the PR5 routine terminates the receive process as performed in the network node receive adapter and forwards the received packet toward the node switch. To that end, first a test 2101 determines the content of the Switch Output Queue (SOQ), wherein the complete packets extracted from the ring have been enqueued. If the queue is empty, then the process branches directly to PR_ENTRY (see FIG. 15). Otherwise, the packet list is dequeued in an operation 2102. The packet is properly routed (see FIG. 11) in an operation 2103 and the sent to the node switch in an operation 2104 before branching back to the main steady state receive process entry.

Given the above detailed flow charts of both transmit and receive operations as applying to the present invention, a person skilled in the programming art shall have no difficulty in implementing the invention without any additional inventive effort being required. Also, as already mentioned, a valuable advantage of this invention derives from its easiness of implementation in already available network nodes, with little additional software means and almost no additional hardware being required. Therefore, this invention is particularly valuable from cost efficiency standpoint, and of high business interest in the present multimedia environment.

While the invention has been shown and described in detail herein in accordance with certain preferred embodiments thereof, modifications and changes therein may be made by those skilled in the art without departing from the spirit and scope of the invention as described and claimed in the appended claims.

We claim:

1. A method for optimizing data transmission link bandwidth occupation in a multipriority data traffic environment of a data communication network, by simulating a high bandwidth link through multiplexing said traffic over lower rate links or virtual channels, said data communication network including network nodes interconnected by data transmission links, each said network nodes including input and output adapters interconnected to each other through a network switch, said data traffic being randomly provided to the network through fixed and/or variable length data packets, said method comprising the steps of:

storing said data packets into output queues selected according to a so-called Quality of Service (QoS) based on each said priority levels;

splitting each said data packets into so-called segments, each segment being provided with a segment header including: a QoS flag defining the corresponding priority level; a packet number reference; a segment number reference; an end of packet flag for identifying the last segment of a processed packet; and validity control bits for header integrity control;

generating a Link Status Control Word (LSCW) including an at least one bit long flag per link, said flag being used to indicate possible link reservation and thus enable an on request link masking;

generating a Link Availability Control word (LACW) including an at least one bit long flag dynamically settable during operation to indicate whether the corresponding link is currently available or busy;

performing a logical AND operation between said LSCW and LACW words for generating a so-called global link availability control word; and monitoring and scanning said output queues on decreasing priority order and multiplexing the segments of said queued packets over said node output links or virtual channels based on said global link availability control word indications.

2. The method of claim 1, wherein said monitoring and scanning of the output queues on decreasing priority order for multiplexing the data segments of enqueued packets further comprises the steps of:

defining a so-called Transmit Status word split into consecutive pairs of bits, each bit of said pairs being used as a Transmit In progress (XIP) flag or a Transmit Queue (XQ) flag, each pair of flags being assigned to a QoS in decreasing priority order;

setting the XIP flag ON to indicate that a packet transmission of the corresponding priority has been started, or setting said flag OFF to indicate that no corresponding packet transmission is in progress;

setting the XQ flag OFF to indicate that the related QoS transmit queue is empty, or setting said flag ON when at least one packet is stored in the corresponding priority queue; and scanning the Transmit Status word in decreasing priority order to enable controlling the transmission by assigning node output links to the non-empty queue of highest priority.

3. The method of claim 2 further comprising the steps of:

generating a group number (gn);

using said gn for splitting said LSCW/LACW control words whereby several sets of aggregate trunks might be defined.

4. A system for optimizing data transmission link bandwidth occupation in a multipriority data traffic environment of a data communication network by simulating a high bandwidth link through multiplexing said traffic randomly provided to the network nodes in the form of fixed or variable length packets, over lower rate network links or virtual channels, each said network nodes including input and output adapters interconnected to each other through a network switching means, said system comprising:

a switch interface interfacing the node switch to the output adapter means;

routing means for routing switch provided data packets either towards processor means for processing network control data or toward a priority organized queuing means selected according to a predefined Quality of Service (QoS) defining a priority assigned to the processed data;

scheduler means cooperating with segmenting means and including:

(a) means for splitting each said data packets into so-called segments, each segment being provided with a segment header including: a QoS flag defining the corresponding priority level; a packet number reference; a segment number reference; an end of packet flag for identifying the last segment of a processed packet; and validity control bits for header integrity control;

(b) means for generating a Link Status Control Word (LSCW) including an at least one bit long flag per link, said flag being used to indicate possible link reservation and thus enable on request link masking;

(c) means for generating a Link Availability Control word (LACW) including an at least one bit long flag dynamically settable during operation to indicate whether the corresponding link is currently available or busy;

(d) means for performing a logical AND operation between said LSCW and LACW words for generating a global link availability control word;

(e) means for monitoring and scanning said output queues on decreasing priority order and multiplexing the segments of said queued packets over said node output links or virtual channels based on said global link availability control word indications.

5. The method of claim 1 further comprising the steps of:

(a) monitoring and scanning the node input links/channels for collecting the received segments, and time stamping the received segments;

(b) resequencing the segments and properly reassembling into the original transmitted packets, based on information recorded into said segment headers and including the corresponding packet number and segment number; and (c) routing the reassembled packets either toward a node processor for network control packets, or toward the node switch for further transmission.

6. The method of claim 5 wherein said segment resequencing and packet reassembling comprises the steps of:

(a) defining a ring structure per processed priority level, said ring being split into consecutive ring elements;

(b) sequentially assigning the ring elements to the received packets and storing in each said ring element a Status flag;

(c) associating with each ring element a Packet Structure for storing therein segment information according to the corresponding segment numbering, and Packet Information relating to the considered received packet.

7. The method of claim 6 further including the operation of Status flags comprising the steps of:

(a) a reassembling In Progress flag set ON when receiving a first segment of a new packet, and set OFF when clearing the ring element;

(b) a Flush flag set ON when a predefined time-out threshold is reached while packet reassembling is not yet achieved, and set OFF when receiving the first segment of a new packet for the same ring element;

(c) a Packet Complete flag set ON when all segments of the same packet have been received; and, (d) an End Of Packet flag set ON when the last segment of a packet, as indicated by a segment header, has been received.

8. The method of claim 7 wherein said Packet Information relating to a considered received packet comprises:

(a) a segment count by counting the number of segments received for a same packet; and, (b) an expected number of segments count in a packet as indicated by the segment sequence number in the header of the segment identified as a last segment of a packet whereby a packet being received may be considered complete when the segment count equals the expected number of segments, thus enabling the routing and transfer of said packet toward a final destination.

9. The method of claim 7 wherein said Packet Structure is made to store segment pointers, each pointing to an assigned buffering location where the segment data are actually being stored.

10. A system for optimizing data link occupation of data packets in a multipriority data traffic environment of a data communication network, comprising;

means for data multiplexing and asynchronously transmitting fixed or variable length data packets in the data communication network;

means for splitting the packets into segments including both a segment number and a packet number;

means for dispatching, on a priority basis, over available links or virtual channels in the data communication network based on a global link availability control word; and means for dynamically adjusting the control word according to specific predefined conditions.

11. The system of claim 10 further comprising:

means for generating a Link Status Contol Word (LSCW) and a Link Availability Control Word (LACW); and means for logically combining the LSCW and LACW to generate the control word.

12. In a data communication network having a multipriority data traffic environment of data packets, a method for optimizing datalink occupation in the data communication network, comprising the steps of:

data multiplexing and asynchronously transmitting fixed or variable length data packets in the data communication network;

splitting the packets into segments including both a segment number and a packet number;

dispatching, on a priority basis, over available links or virtual channels in the data communication network based on a global link availability control word; and dynamically adjusting the control word according to specific predefined conditions.

13. An article of manufacturing, comprising:

a computer usable medium having computer readable program code mans embodied therein for optimizing datalink occupation in the data communication network having a multipriority data traffic environment of data packets, the computer readable program code means in said article of manufacture comprising:

computer readable program code means for data multiplexing and asynchronously transmitting fixed or variable length data packets in the data communication network;

computer readable program code means for splitting the packets into segments including both a segment number and a packet number;

computer readable program code means for dispatching, on a priority basis, over available links or virtual channels in the data communication network based on a global link availability control word; and computer readable program code means for dynamically adjusting the control word according to specific predefined conditions.

* * * * *